US006936370B1

(12) United States Patent
Knights et al.

(10) Patent No.: US 6,936,370 B1
(45) Date of Patent: Aug. 30, 2005

(54) SOLID POLYMER FUEL CELL WITH IMPROVED VOLTAGE REVERSAL TOLERANCE

(75) Inventors: Shanna D. Knights, Burnaby (CA); David P. Wilkinson, North Vancouver (CA); Stephen A. Campbell, Maple Ridge (CA); Jared L. Taylor, Davis, CA (US); John M. Gascoyne, High Wycombe (GB); Thomas R. Ralph, Reading (GB)

(73) Assignees: Ballard Power Systems Inc., Burnaby (CA); Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/643,550

(22) Filed: Aug. 22, 2000

Related U.S. Application Data

(63) Continuation-in-part of application No. 09/404,897, filed on Sep. 24, 1999, now abandoned.
(60) Provisional application No. 60/150,253, filed on Aug. 23, 1999.

(51) Int. Cl.[7] .............................................. H01M 4/96
(52) U.S. Cl. ...................... 429/40; 429/41; 429/218.1
(58) Field of Search ...................... 429/40, 41, 218.1

(56) References Cited

U.S. PATENT DOCUMENTS

| 4,348,268 | A | * | 9/1982 | Muller ...................... 204/290 |
| 4,360,417 | A | | 11/1982 | Reger et al. ................ 204/290 |
| 4,589,969 | A | | 5/1986 | Yurkov et al. .............. 204/290 |
| 5,672,439 | A | * | 9/1997 | Wilkinson et al. ............ 429/40 |
| 5,945,231 | A | * | 8/1999 | Narayanan et al. ........... 429/30 |
| 6,110,861 | A | * | 8/2000 | Krumpelt et al. ........... 502/326 |
| 6,171,721 | B1 | * | 1/2001 | Narayanan et al. ........... 429/41 |

FOREIGN PATENT DOCUMENTS

| EP | 0 736 921 | 10/1996 |
| EP | 0 716 463 | 12/1996 |
| JP | 59-225740 | 12/1984 |
| JP | 62-024568 | 2/1987 |
| JP | 01-246765 | 10/1989 |
| JP | 09-035736 | 2/1997 |
| JP | 10-055807 | 2/1998 |

OTHER PUBLICATIONS

"Kirk–Othmer Enclyclopedia of Chemical Technology", 3rd Edition, J. Wiley & Sons, vol. 10, pp. 248–249 (Date unknown).
"Regenerative Fuel Cell Subsystems", Chemistry 869, Course in Electrochemistry at Simon Fraser University, pp. 1–12 (Nov. 1996).
Arico, et al. "Electro–chemical and physico–chemical characterization of carbon–supported and unsupported Pt–Ru catalysts for application in direct methanol fuel cells," *Meeting Abstracts*, Abstract No. 77, vol. 99–1, 195 Meeting of the Electrochemical Society, Inc. (May 1999).
Iwase et al. Optimized CO Tolerant Electrocatalysts for Polymer Electrolyte Fuel Cells, *Electrochemical Society Proceedings*, vol. 95, pp. 12–23 (Date unknown).
Ledjeff, "Development of Pressure Electrolyser and Fuel Cell with Polymer Electrolyte," *Int. J. Hydrogen Energy*, vol. 19, No. 5, pp. 453–455 (1994).
Rolison et al. "Role of Hydrous Ruthenium Oxide in Pt–Ru Direct Methanol Fuel Cell Anode Electrocatalysts: The Importance of Mixed Electron/Proton Conductivity," *Langmuir 15*:774–779 (1999).
Savadogo, "New Materials for Water Electrolysis and Photoelectrolysis," *Hydrogen Energy, World Conference*, pp. 2065–2092 (1996).
Shao, et al. "Bifunctional electrodes with a thin catalyst layer for 'unitized' proton exchange membrane regenerative fuel cell", *Journal of Power Sources*, pp. 82–85 (abstract only) (1999).
Stucki et al., "Evaluation of Materials for A Water Electrolyzer of the Membrane Type", Brown Boveri Research Center, Switzerland, pp. 1799–1808 (Date unknown).
Swette, et al. "Conference Paper" *Lewis Research Center, Space Electrochemical Research and Technology*, pp. 139–148 (abstract only) (Date unknown).
Wilkinson et al. "Materials and Approaches for CO and $CO_2$ Tolerance for Polymer Electrolyte Membrane Fuel Cells", *New Materials for Fuel Cell and Modern Battery Systems II, Proceedings of the Second International Symposium on New Materials for Fuel Cell and Modern Battery Systems*, 11 pages having 2 columns of text per page (Jul. 1997).
Nartey et al., "Overcharge Protection for the MnO2 Cathode in Alkaline Zn–MnO2 Batteries," *Ghana J. of Chem*, pp. 3(1), 7–10 (1997).

* cited by examiner

*Primary Examiner*—Frankie L. Stinson
*Assistant Examiner*—Monique Wills
(74) *Attorney, Agent, or Firm*—McAndrews, Held & Malloy, Ltd.

(57) ABSTRACT

In a solid polymer fuel cell series, various circumstances can result in the fuel cell being driven into voltage reversal. For instance, cell voltage reversal can occur if that cell receives an inadequate supply of fuel (for example, fuel starvation). In order to pass current during fuel starvation, reactions other than fuel oxidation may take place at the fuel cell anode, including water electrolysis and oxidation of anode components. The latter may result in significant degradation of the anode. Such fuel cells can be made more tolerant to cell reversal by promoting water electrolysis over anode component oxidation at the anode. This can be accomplished by incorporating a catalyst composition at the anode to promote the water electrolysis reaction, in addition to the typical anode electrocatalyst for promoting fuel oxidation.

41 Claims, 14 Drawing Sheets

SOLID POLYMER FUEL CELL WITH IMPROVED VOLTAGE REVERSAL TOLERANCE

CROSS-REFERENCE TO RELATED APPLICATION

This is a continuation-in-part of application Ser. No. 09/404,897, filed on Sep. 24, 1999 now abandoned, entitled "Solid Polymer Fuel Cell with Improved Voltage Reversal Tolerance". This application is related to and claims priority benefits from U.S. Provisional Patent Application Ser. No. 60/150,253 filed Aug. 23, 1999, entitled "Fuel Cell Anode Structure for Voltage Reversal Tolerance". The '897 application and the '253 provisional application are each incorporated herein by reference in their entirety.

FIELD OF THE INVENTION

The present invention relates to an anode for use in fuel cells, particularly solid polymer electrolyte fuel cells, having improved tolerance to voltage reversal, and to fuel cells comprising said anode.

BACKGROUND OF THE INVENTION

Fuel cell systems are currently being developed for use as power supplies in numerous applications, such as automobiles and stationary power plants. Such systems offer promise of delivering power economically and with environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Fuel cells generally employ an electrolyte disposed between two electrodes, namely a cathode and an anode. A catalyst typically induces the desired electrochemical reactions at the electrodes. Preferred fuel cell types include solid polymer electrolyte fuel cells that comprise a solid polymer electrolyte and operate at relatively low temperatures.

A broad range of reactants can be used in solid polymer electrolyte fuel cells. For example, the fuel stream may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a solid polymer electrolyte fuel cell, fuel is electrochemically oxidized at the anode electrocatalyst, typically resulting in the generation of protons, electrons, and possibly other species depending on the fuel employed. The protons are conducted from the reaction sites at which they are generated, through the electrolyte, to electrochemically react with the oxidant at the cathode electrocatalyst. The electrocatalysts are preferably located at the interfaces between each electrode and the adjacent electrolyte.

Solid polymer electrolyte fuel cells employ a membrane electrode assembly ("MEA"), which comprises the solid polymer electrolyte or ion-exchange membrane disposed between the two electrodes. Separator plates, or flow field plates for directing the reactants across one surface of each electrode substrate, are disposed on each side of the MEA.

Each electrode contains an electrocatalyst layer, comprising an appropriate catalyst for facilitating the desired electrochemical reaction of the fuel and oxidant, located adjacent the solid polymer electrolyte. The electrocatalyst may be a metal black, an alloy or a supported metal catalyst, for example, platinum on carbon. The catalyst layer typically contains ionomer that may be similar to that used for the solid polymer electrolyte (for example, Nafion®). The catalyst layer may also contain a binder, such as polytetrafluoroethylene.

The electrodes may also contain a substrate (typically a porous electrically conductive sheet material) that may be employed for purposes of reactant distribution and/or mechanical support. Optionally, the electrodes may also contain a sublayer (typically containing an electrically conductive particulate material, for example carbon black) between the catalyst layer and the substrate. A sublayer may be used to modify certain properties of the electrode (for example, interface resistance between the catalyst layer and the substrate).

Electrodes for a MEA can be prepared by first applying a sublayer, if desired, to a suitable substrate, and then applying the catalyst layer onto the sublayer. These layers can be applied in the form of slurries or inks that contain particulates and dissolved solids mixed in a suitable liquid carrier. The liquid carrier is then evaporated off to leave a layer of particulates and dispersed solids. Cathode and anode electrodes may then be bonded to opposite sides of the membrane electrolyte via application of heat and/or pressure, or by other methods. Alternatively, catalyst layers may first be applied to the membrane electrolyte with optional sublayers and substrates incorporated thereafter, either on the catalyzed membrane or an electrode substrate.

In operation, the output voltage of an individual fuel cell under load is generally below one volt. Therefore, in order to provide greater output voltage, multiple cells are usually stacked together and are connected in series to create a higher voltage fuel cell stack. (End plate assemblies are placed at each end of the stack to hold the stack together and to compress the stack components together. Compressive force effects sealing and provides adequate electrical contact between various stack components.) Fuel cell stacks can then be further connected in series and/or parallel combinations to form larger arrays for delivering higher voltages and/or currents.

Electrochemical fuel cells are occasionally subjected to a voltage reversal condition, which is a situation in which the cell is forced to the opposite polarity. Opposite polarity may be deliberately induced, as in the case of certain electrochemical devices known as regenerative fuel cells. (Regenerative fuel cells are designed and constructed to operate both as fuel cells and as electrolyzers in order to produce a supply of reactants for fuel cell operation. Such devices have the capability of directing a water fluid stream to an electrode where, upon passage of an electric current, oxygen is formed. Hydrogen is formed at the other electrode.) Power-producing electrochemical fuel cells connected in series are potentially subject to unwanted voltage reversals, however, such as when one of the cells is forced to the opposite polarity by the other cells in the series. In fuel cell stacks, this can occur when a cell is unable to produce, from the electrochemical reactions occurring within it, the current being produced by the rest of the cells in the stack and that is being directed through the affected cell by virtue of its being in series with the rest of the cells. Groups of cells within a stack can also undergo voltage reversal and even entire stacks can be driven into voltage reversal by other stacks in an array. Aside from the loss of power associated with one or more cells going into voltage reversal, this situation poses reliability concerns. Undesirable electrochemical reactions may occur, which may detrimentally affect fuel cell components. Component degradation reduces the reliability and performance of the affected fuel cell, and in turn, its associated stack and array.

The adverse effects of voltage reversal can be prevented, for instance, by employing diodes capable of carrying the stack current across each individual fuel cell or by monitoring the voltage of each individual fuel cell and shutting down an affected stack if a low cell voltage is detected. Since stacks typically employ numerous fuel cells, however, such approaches can be quite complex and expensive to implement.

Alternatively, other conditions associated with voltage reversal may be monitored instead, and appropriate corrective action can be taken if reversal conditions or the onset of reversal conditions are detected. For instance, a specially constructed sensor cell may be employed that is more sensitive than other fuel cells in the stack to certain conditions leading to voltage reversal (for example, fuel starvation of the stack). Thus, instead of monitoring every cell in a stack, only the sensor cell need be monitored and used to prevent widespread cell voltage reversal under such conditions. Other conditions leading to voltage reversal may exist that a sensor cell cannot detect, however (such as, for example, a defective individual cell in the stack). Another approach is to employ exhaust gas monitors that detect voltage reversal by detecting the presence of or abnormal amounts of species in an exhaust gas of a fuel cell stack that originate from reactions that occur during reversal. While exhaust gas monitors can detect a reversal condition occurring within any cell in a stack and may suggest the cause of reversal, such monitors do not specifically identify problem cells and they do not generally provide a warning of an impending voltage reversal.

Instead of or in combination with the preceding, a passive approach may be preferred such that, in the event that reversal does occur, the fuel cells are either more tolerant to the reversal or are controlled in such a way that degradation of critical hardware is reduced. A passive approach may be particularly preferred if the conditions leading to reversal are temporary. If the cells can be made more tolerant to voltage reversal, it may not be necessary to detect for reversal and/or shut down the fuel cell system during a temporary reversal period.

SUMMARY OF THE INVENTION

During voltage reversal, electrochemical reactions may occur that result in the degradation of certain components in the affected fuel cell. Depending on the reason for the voltage reversal, there can be a rise in the absolute potential of the fuel cell anode. This can occur, for instance, when the reason is an inadequate supply of fuel (for example, fuel starvation). During such a reversal in a solid polymer fuel cell, for example, water present at the anode may be electrolyzed and oxidation (corrosion) of the anode components may occur. It is preferred to have water electrolysis occur rather than component oxidation. When water electrolysis reactions at the anode cannot consume the current forced through the cell, the rate of oxidation of the anode components increases, thereby tending to irreversibly degrade certain anode components at a greater rate. A solid polymer electrolyte fuel cell can be made more tolerant to voltage reversal by incorporating an additional catalyst at the anode that promotes the electrolysis of water. Thus, more of the current forced through the cell may be consumed in the electrolysis of water than in the oxidation of anode components.

A typical solid polymer electrolyte fuel cell comprises a cathode, an anode, a solid polymer electrolyte, an oxidant fluid stream directed to the cathode and a fuel fluid stream directed to the anode.

In a reversal tolerant fuel cell, the anode comprises a first catalyst composition for evolving protons from the fuel and a second catalyst composition for evolving oxygen from water. The first catalyst composition is typically selected from the group consisting of precious metals, transition metals, oxides thereof, alloys thereof, and mixtures thereof. A preferred first catalyst composition for evolving protons from the fuel comprises platinum metal. For fuel cells operating on fuel streams containing carbon monoxide and carbon dioxide, an alloy of Pt/Ru is particularly preferred, which may for example be unsupported or supported at various loadings, such as 20%/10% by weight Pt/Ru or 40%/20% by weight Pt/Ru. Other compositions may be preferred depending on fuel type (for example, Pt metal for gaseous hydrogen).

The second catalyst composition is incorporated for purposes of electrolyzing water at the anode during voltage reversal situations. Preferred compositions thus include precious metal oxides, particularly those in the group consisting of ruthenium oxide and iridium oxide. Such oxides are characterized by the chemical formulae $RuO_x$ and $IrO_x$, where x is greater than 1 and particularly about 2. Preferred compositions may also comprise mixtures and solid solutions of precious metal oxides, or mixtures and solid solutions of precious metal oxides and valve metal oxides, such as $TiO_y$ (where y is less than or about equal to 2), for example.

Either or both of the first and second catalyst compositions may be unsupported or, instead, supported on a suitable electrically conductive supporting material, such as carbon, titanium oxides. (for example, $Ti_4O_7$), other valve metal oxides, or any combination thereof. Carbon is a preferred support for either catalyst composition (for example, acetylene or furnace blacks). Two different support materials (that is, first and second supports) may be employed for the first and second catalyst compositions or the two compositions may be deposited on the same supporting powder. In the case of the latter, the second composition may be deposited on the support after the first composition is deposited. For instance, the voltage reversal tolerance of an anode comprising carbon supported Pt/Ru alloy (for example, nominally 20/10 percent by weight of Pt/Ru) may be improved by depositing $RuO_2$ thereon (for example, nominally 20% by weight Ru).

The first and second catalyst compositions may be incorporated in one or more common layers in the anode, for example by depositing both on the same support and applying to a suitable substrate or by mixing the two catalyst compositions and applying the mixture to a suitable substrate in one or more layers. Alternatively, the first and second catalyst compositions may be incorporated in separate layers in the anode, for example by applying the two catalyst compositions to a suitable anode substrate in two separate layers thereby forming a bilayer anode.

DETAILED DESCRIPTION OF PREFERRED EMBODIMENT(S)

Figure 1:
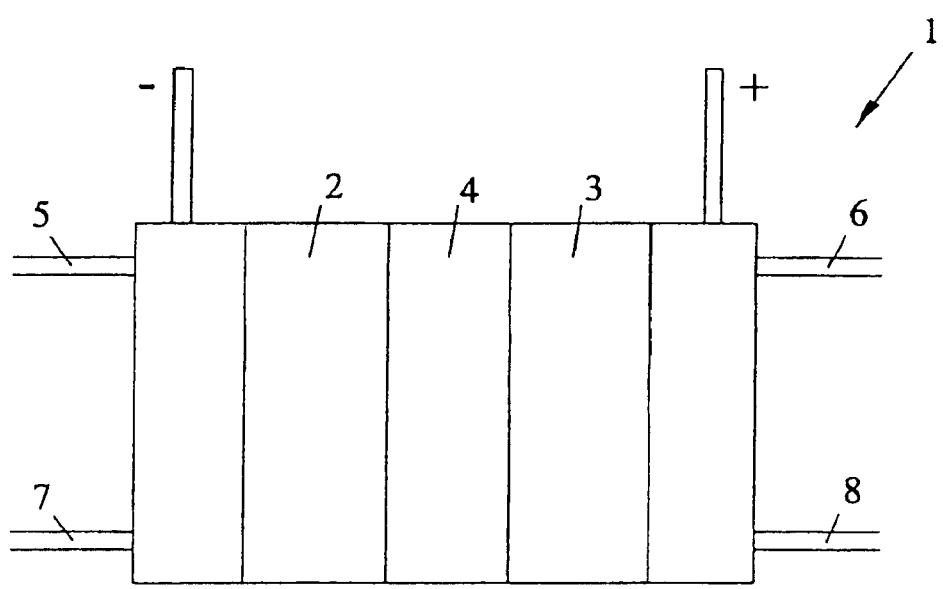
FIG. 1 is a schematic diagram of a solid polymer fuel cell.

Voltage reversal occurs when a fuel cell in a series stack cannot generate sufficient current to keep up with the rest of the cells in the series stack. Several conditions can lead to voltage reversal in a solid polymer fuel cell, for example, including insufficient oxidant, insufficient fuel, insufficient water, low or high cell temperatures, and certain problems with cell components or construction. Reversal generally occurs when one or more cells experience a more extreme level of one of these conditions compared to other cells in the stack. While each of these conditions can result in negative fuel cell voltages, the mechanisms and consequences of such a reversal may differ depending on which condition caused the reversal.

During normal operation of a solid polymer fuel cell on hydrogen fuel, for example, the following electrochemical reactions take place:

| at the anode: | $H_2 \rightarrow 2H^+ + 2e^-$ |
| at the cathode: | $\frac{1}{2}O_2 + 2H^+ + 2e^- \rightarrow H_2O$ |
| overall: | $H_2 + \frac{1}{2}O_2 \rightarrow H_2O$ |

However, with insufficient oxidant (oxygen) present, the protons produced at the anode cross the electrolyte and combine with electrons directly at the cathode to produce hydrogen gas. The anode reaction and thus the anode potential remain unchanged. However, the absolute potential of the cathode drops and the reaction is at the cathode, in the absence of oxygen:

$$2H^+ + 2e^- \rightarrow H_2$$

In this case, the fuel cell is operating like a hydrogen pump. Since the oxidation of hydrogen gas and the reduction of protons are both very facile (that is, small overpotential), the voltage across the fuel cell during this type of reversal is quite small. Hydrogen production actually begins at small positive cell voltages (for example, 0.03 V) because of the large hydrogen concentration difference present in the cell.

The cell voltage observed during this type of reversal depends on several factors (including the current and cell construction) but, at current densities of about 0.5 A/cm², the fuel cell voltage may typically be less than or about −0.1 V.

An insufficient oxidant condition can arise when there is water flooding in the cathode, oxidant supply problems, and the like. Such conditions then lead to low magnitude voltage reversals with hydrogen being produced at the cathode. Significant heat is also generated in the affected cell(s). These effects raise potential reliability concerns, however the low potential experienced at the cathode does not typically pose a significant corrosion problem for the cathode components. Nonetheless, some degradation of the membrane might occur from the lack of water production and from the heat generated during reversal. The continued production of hydrogen may also result in some damage to the cathode catalyst.

A different scenario takes place when there is insufficient fuel present. In this case, the cathode reaction and thus the cathode potential remain unchanged. However, the anode potential rises to the potential for water electrolysis. Then, as long as water is available, electrolysis takes place at the anode. However, the potential of the anode is then generally high enough to significantly start oxidizing typical components used in the anode, for example, the carbons employed as supports for the catalyst or the electrode substrates. Thus, some anode component oxidation typically occurs along with electrolysis. (Thermodynamically, oxidation of the carbon components actually starts to occur before electrolysis. However, it has been found that electrolysis appears kinetically preferred and thus proceeds at a greater rate.) The reactions in the presence of oxidizable carbon-based components are typically:

at the anode, in the absence of fuel:

$$H_2O \rightarrow \frac{1}{2}O_2 + 2H^+ + 2e^-$$

and $$\frac{1}{2}C + H_2O \rightarrow \frac{1}{2}CO_2 + 2H^+ + 2e^-$$

More current can be sustained by the electrolysis reaction if more water is available at the anode. However, if not consumed in the electrolysis of water, current is instead used in the corrosion of the anode components. If the supply of water at the anode runs out, the anode potential rises further and the corrosion rate of the anode components increases. Thus, there is preferably an ample supply of water at the anode in order to prevent degradation of the anode components during reversal.

The voltage of a fuel cell experiencing fuel starvation is generally much lower than that of a fuel cell receiving insufficient oxidant. During reversal from fuel starvation, the cell voltage ranges around −1 V when most of the current is carried by water electrolysis. However, when electrolysis cannot sustain the current (for example, if the supply of water runs out or is inaccessible), the cell voltage can drop substantially (much less than −1 V) and is theoretically limited only by the voltage of the remaining cells in the series stack. Current is then carried by corrosion reactions of the anode components or through electrical shorts, including dielectric breakdown of the membrane electrolyte, which may develop as a result. Additionally, the cell may dry out, leading to very high ionic resistance and further heating. The impedance of the reversed cell may increase such that the cell is unable to carry the current provided by the other cells in the stack, thereby further reducing the output power provided by the stack.

Fuel starvation can arise when there is severe water flooding at the anode, fuel supply problems, and the like. Such conditions can lead to high magnitude voltage reversals (that is, much less than −1 V) with oxygen and carbon dioxide being produced at the anode. Significant heat is again generated in the reversed cell. These effects raise more serious reliability concerns than in an oxidant starvation condition. Very high potentials may be experienced at the anode, thereby posing a serious anode corrosion, and hence reliability, concern.

Voltage reversals may also originate from low fuel cell temperatures, for example at start-up. Cell performance decreases at low temperatures for kinetic, cell resistance, and mass transport limitation reasons. Voltage reversal may then occur in a cell whose temperature is lower than the others due to a temperature gradient during start-up. Reversal may also occur in a cell because of impedance differences that are amplified at lower temperatures. When voltage reversal is due solely to such low temperature effects, however, the normal reactants are generally still present at both the anode and cathode (unless, for example, ice has formed so as to block the flowfields). In this case, voltage reversal is caused by an increase in overpotential only. The current forced through the reversed cell still drives the normal reactions to occur and thus the aforementioned corrosion issues arising from a reactant starvation condition are less of a concern. (With higher anode potentials, however, anode components may also be oxidized.) This type of reversal is primarily a performance issue that is resolved when the stack reaches a normal operating temperature.

Problems with certain cell components and/or construction can also lead to voltage reversals. For instance, a lack of catalyst on an electrode due to manufacturing error would render a cell incapable of providing normal output current. Similarly degradation of catalyst or another component for other reasons could render a cell incapable of providing normal output current.

In the present approach, fuel cells are rendered more tolerant to voltage reversal by incorporating an additional catalyst composition at the anode to further promote water electrolysis during cell voltage reversal. It is thus advantageous in situations where electrolyzing more water is beneficial (for example, during fuel starvation).

FIG. 1 shows a schematic diagram of a solid polymer fuel cell. Solid polymer fuel cell 1 comprises anode 2, cathode 3, and solid polymer electrolyte 4. Both anode and cathode typically employ catalysts supported on carbon powders that are mounted in turn upon porous carbonaceous substrates. A fuel stream is supplied at fuel inlet 5 and an oxidant stream is supplied at oxidant inlet 6. The reactant streams are exhausted at fuel and oxidant outlets 7 and 8 respectively. In the absence of fuel, water electrolysis and oxidation of the carbon components in the anode may occur.

Figure 2:
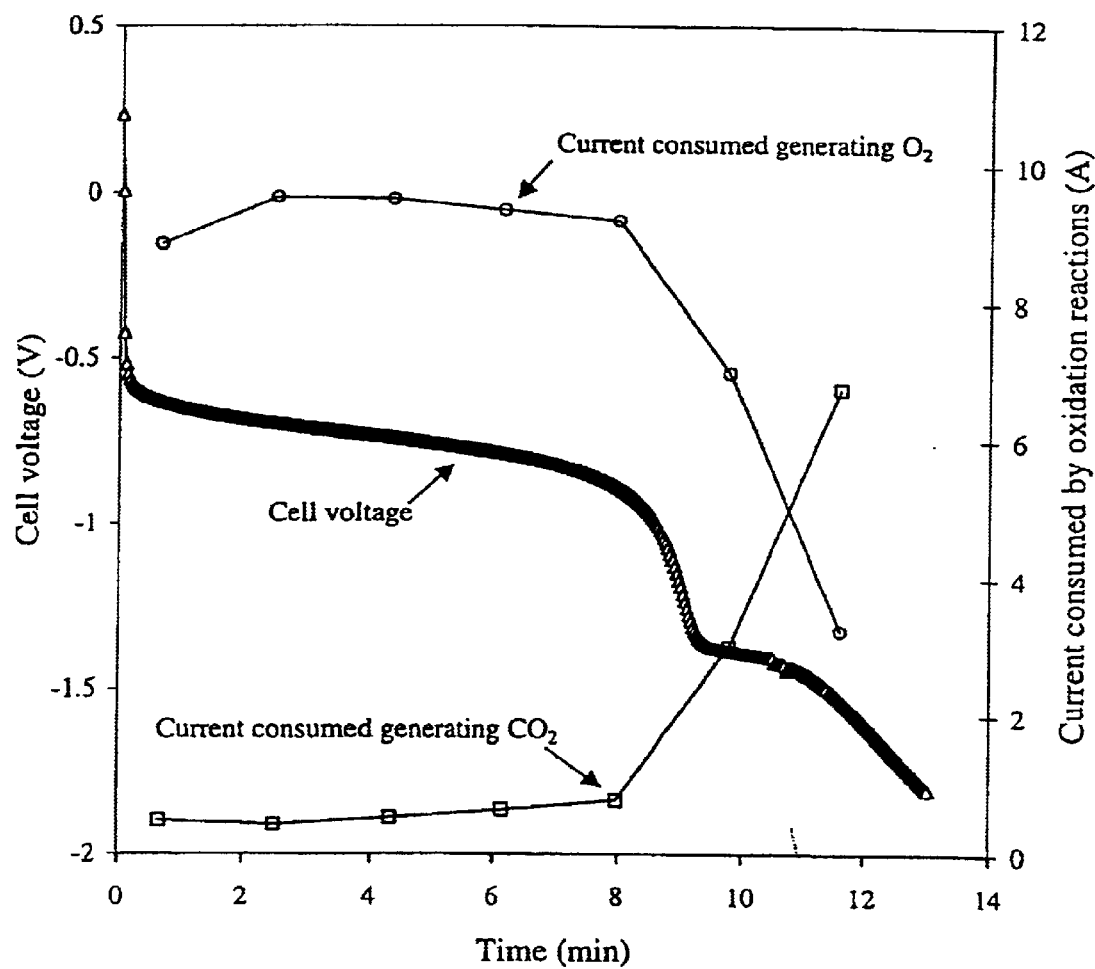
FIG. 2 is a representative composite plot of voltage as a function of time, as well as the currents consumed generating carbon dioxide and oxygen as a function of time, respectively, for a conventional solid polymer fuel cell undergoing fuel starvation.

FIG. 2 is a representative plot of voltage as a function of time for a conventional solid polymer fuel cell undergoing fuel starvation. (The fuel cell anode and cathode comprised carbon-supported Pt/Ru and Pt electrocatalysts, respectively, on carbon fiber paper substrates.) In this case, a stack reversal situation was simulated by using a constant current (10 A) power supply to drive current through the cell, and a fuel starvation condition was created by flowing humidified nitrogen (100% relative humidity (RH)) across the anode instead of the fuel stream. The exhaust gases at the fuel outlet of this conventional fuel cell were analyzed by gas chromatography during the simulated fuel starvation. The rates at which oxygen and carbon dioxide appeared in the anode exhaust were determined and used to calculate the current consumed in producing each gas also shown in FIG. 2.

As shown in FIG. 2, the cell quickly went into reversal and dropped to a voltage of about −0.6 V. The cell voltage was then roughly stable for about 8 minutes, with only a slight increase in overvoltage with time. During this period, most of the current was consumed in the generation of oxygen via electrolysis ($H_2O \rightarrow \frac{1}{2}O_2 + 2H^+ + 2e^-$). A small amount of current was consumed in the generation of carbon dioxide ($\frac{1}{2}C + H_2O \rightarrow \frac{1}{2} CO_2 + 2H^+ + 2e^-$). The electrolysis reaction thus sustained most of the reversal current during this period at a rough voltage plateau from about −0.6 to −0.9V. At that point, it appeared that electrolysis could no longer sustain the current and the cell voltage dropped abruptly to about −1.4 V. Another voltage plateau developed briefly, lasting about 2 minutes. During this period, the amount of current consumed in the generation of carbon dioxide increased rapidly, while the amount of current consumed in the generation of oxygen decreased rapidly. On this second voltage plateau therefore, significantly more carbon was oxidized in the anode than on the first voltage plateau. After about 11 minutes, the cell voltage dropped off quickly again. Typically thereafter, the cell voltage continued to fall rapidly to very negative voltages (not shown) until an internal electrical short developed in the fuel cell (representing a complete cell failure). Herein, the inflection point at the end of the first voltage plateau is considered as indicating the end of the electrolysis period. The inflection point at the end of the second plateau is considered as indicating the point beyond which complete cell failure can be expected.

Without being bound by theory, the electrolysis reaction observed at cell voltages between about −0.6 V and about −0.9 V is presumed to occur because there is water present at the to anode catalyst and the catalyst is electrochemically active. The end of the electrolysis plateau in FIG. 2 may indicate an exhaustion of water in the vicinity of the catalyst or loss of catalyst activity (for example, by loss of electrical contact to some extent). The reactions occurring at cell voltages of about −1.4 V would presumably require water to be present in the vicinity of anode carbon material without being in the vicinity of, or at least accessible to, active catalyst (otherwise electrolysis would be expected to occur instead). The internal shorts that develop after prolonged reversal to very negative voltages appear to stem from severe local heating which occurs inside the membrane electrode assembly, which may melt the polymer electrolyte, and create holes that allow the anode and cathode electrodes to touch.

In practice, a minor adverse effect on subsequent fuel cell performance may be expected after the cell has been driven into the electrolysis regime during voltage reversal (that is, driven onto the first voltage plateau). For instance, a 50 mV drop may be observed in subsequent output voltage at a given current for a fuel cell using carbon-supported anode catalyst. (It has been found however that fuel cells using unsupported anode catalysts, for example platinum blacks, are less degraded when subjected to cell reversal.) More of an adverse effect on subsequent fuel cell performance (for example, 150 mV drop) will likely occur after the cell has been driven into reversal onto the second voltage plateau. Beyond that, complete cell failure can be expected as a result of internal shorting. Thus, if a cell is going to be subjected to a voltage reversal situation, it seems preferable to promote electrolysis and also to extend the period of electrolysis, thereby limiting the negative voltage experienced by the cell and thereby reducing degradation and making it less likely that the cell will be exposed to more serious reversal conditions.

Incorporating an additional or second catalyst composition at the anode for purposes of electrolyzing water may thus improve the tolerance of such a fuel cell to voltage reversals of this kind. Suitable compositions are those which are stable at the potentials and in the acidic environment of a solid polymer electrolyte fuel cell, which have a lower overpotential for oxygen evolution than the first catalyst composition, and which are electrically conducting at that potential. In a preferred solid polymer electrolyte fuel cell, where the first catalyst composition comprises platinum for proton production, certain precious metal oxides, for example ruthenium oxide and iridium oxide, meet the requirements of a suitable second catalyst composition. Mixtures and/or solid solutions thereof may also be suitable. (See S. Stuki and R. Müller, Advances in Hydrogen Energy 2, 4 (1981), pp. 1799–1808.) "Solid solution" is defined as a homogeneous crystalline phase composed of several distinct chemical species, occupying the lattice points at random and existing in a range of concentrations.

The second catalyst composition may comprise mixtures and/or solid solutions of precious metal oxides, or mixtures and/or solid solutions of precious metal oxides and valve metal oxides, such as $TiO_y$ (where y is less than or about equal to 2), for example. (See K. Kinoshita, Electrochemical Oxygen Technology, pp. 342–46, J. Wiley & Sons, New York, 1992). A valve metal is defined as "one that is capable of forming a protective oxide coating when employed as the anode of an electrochemical cell" (Kirk-Othmer Encyclopaedia of Chemical Technology, Vol. 10, p. 248, 3rd Ed., J. Wiley & Sons, New York, 1980) but from an electrochemical point of view the following are the most appropriate: hafnium, niobium, tantalum, titanium, tungsten and zirconium.

Ruthenium oxide (rutile form, $RuO_x$ where $1<x\leq2$) is the more active catalyst for oxygen evolution and thus seems to be a preferred second catalyst composition. However, if a voltage reversal is prolonged or if there is sufficient cumulative time in reversal, the ruthenium oxide may be further oxidized to $RuO_3$ or $RuO_4$ and may dissolve in the membrane electrolyte. Iridium oxide is not as active for oxygen evolution but is more stable than ruthenium oxide. Thus, $IrO_x$ may be preferred if prolonged reversals are a concern. A mixture or solid solution of ruthenium and iridium oxides may afford a preferred combination of low oxygen overpotential and stability. A mixture or solid solution of ruthenium oxide and a valve metal oxide, such as titanium dioxide, for example, may afford another preferred combination for low oxygen overpotential and stability.

The second catalyst composition may either be unsupported or supported in dispersed form on a suitable electrically conducting particulate support. If desired, the second catalyst composition may even be supported on the same support as the first catalyst composition. (For instance, the first catalyst composition may be deposited on a suitable support initially and then the second catalyst composition may be deposited thereon afterwards.) High surface area carbons such as acetylene or furnace blacks are commonly used as supports for such catalysts. Preferably, the support used is itself tolerant to voltage reversal. Thus, it is desirable to consider using carbon supports that are more corrosion resistant (for example, more graphitic carbons).

Instead of carbon, an electrically conductive titanium oxide may be considered as a suitable high surface area support for the second catalyst composition. For instance, $Ti_4O_7$ may serve as a suitable supported second catalyst composition. In this regard, other valve metal oxides might be considered as well if they have acceptable electronic conductivity when acting as supports for the second catalyst composition.

The amount of the second catalyst composition that is desirably incorporated will depend on such factors as the fuel cell stack construction and operating conditions (for example, current that may be expected in reversal), cost, and so on. It is expected that some empirical trials will determine an optimum amount for a given application.

The second catalyst composition may be incorporated in the anode in various ways. Preferably, it is located where water is readily available and such that it can favorably compete with the other oxidation reactions that degrade the anode structure. For instance, the first and second catalyst compositions may be mixed together and the mixture applied in a common layer or layers on a suitable anode substrate. Alternatively, as mentioned above, the second catalyst composition may be supported on the same support as the first composition, and thus both compositions are already "mixed" for application in one or more layers on an anode substrate. Further however, the two compositions may instead be applied in separate layers on an anode substrate, thereby making a bilayer or multilayer anode structure where the first and second catalyst compositions are in discrete layers. This may be advantageous in certain embodiments.

Along with promoting electrolysis during reversal via the incorporation of an additional catalyst composition, other modifications might desirably be adopted to improve tolerance to voltage reversal. For instance, component and/or structural modifications to the anode may be useful in providing and maintaining more water in the vicinity of the anode catalyst during voltage reversal. The use of an ionomer with a higher water content in the catalyst layer would be an example of a component modification that would result in more water in the vicinity of the anode catalyst. Tolerance to voltage reversal might also be improved by employing more corrosion resistant anode components (for example, graphite or titanium oxide supports) or by protecting the components against corrosion using other methods (for example, by covering the exposed areas of the supports with more catalyst thereby protecting their surface).

The following examples illustrate certain embodiments and aspects of the invention. However, these examples should not be construed as limiting in any way.

EXAMPLES

A series of catalyst samples were prepared in order to evaluate ex-situ oxygen evolution performance to compare their potential ability to improve anode tolerance during voltage reversal in a fuel cell. The catalyst compositions were prepared on carbon supports as indicated below.

The catalyst samples prepared were:

C1: Pt/Ru alloy supported on Shawinigan acetylene black (from Chevron Chemical Company, Texas, USA), nominally 20% Pt/10% Ru by weight (the remainder being carbon);

C2: Pt/Ru alloy supported on Vulcan XC72R grade furnace black (from Cabot Carbon Ltd., South Wirral, UK), nominally 20% Pt/10% Ru by weight;

C3: Pt/Ru alloy and $RuO_2$ supported on Shawinigan acetylene black, nominally 16% Pt/8% Ru (as alloy)/20% Ru (as $RuO_2$) by weight;

C4: Pt/Ru alloy and $RuO_2$ supported on Vulcan XC72R grade furnace black, nominally 16% Pt/8% Ru (as alloy)/ 20% Ru (as $RuO_2$) by weight;

C5: Pt/Ru alloy and $RuO_2$ supported on graphitized Vulcan XC72R grade furnace black graphitized at temperatures above 2500° C.), nominally 16% Pt/8% Ru (as alloy)/20% Ru (as $RuO_2$) by weight;

C6: $RuO_2$ supported on Shawinigan acetylene black, nominally 20% Ru (as oxide) by weight (remainder carbon and oxygen);

C7: $IrO_2$ supported on Shawinigan acetylene black, nominally 20% Ir (as oxide) by weight (remainder carbon and oxygen);

C8: $RuO_2/TiO_2$ supported on Shawinigan acetylene black, nominally 20% Ru (as oxide) by weight and a 50:50 atomic Ru/Ti ratio;

C9: $RuO_2/TiO_2$ supported on Shawinigan acetylene black, nominally 20% Ru (as oxide) by weight and a 70:30 atomic Ru/Ti ratio;

C10: $RuO_2/TiO_2$ supported on Shawinigan acetylene black, nominally 20% Ru (as oxide) by weight and a 90:10 atomic Ru/Ti ratio;

C11: $RuO_2/IrO_2$ supported on Shawinigan acetylene black, nominally 20% Ru (as oxide) by weight and a 90:10 atomic Ru/Ir ratio;

C12: $IrO_2/TiO_2$ supported on Shawinigan acetylene black, nominally 20% Ir (as oxide) by weight and a 90:10 atomic Ir/Ti ratio;

C13: $RuO_2$ supported on Shawinigan acetylene black, nominally 20% Ru (as oxide) by weight (remainder carbon and oxygen);

C14: $RuO_2$ supported on Shawinigan acetylene black, nominally 20% Ru (as oxide) by weight (remainder carbon and oxygen).

In terms of the corrosion resistance of the carbon supports, the order of corrosion resistance is Vulcan XC72R (graphitized)>Shawinigan>Vulcan XC72R. This order of corrosion resistance is related to the graphitic nature of the carbon supports. The more graphitic the support, the more corrosion resistant the support. The graphitic nature of a carbon is exemplified by the carbon inter-layer separation $d_{002}$ measured from the x-ray diffractograms. Synthetic graphite (essentially pure graphite) has a spacing of 3.36 Å compared with 3.45 Å for Vulcan XC72R (graphitized), 3.50 Å for Shawinigan, and 3.64 Å for Vulcan XC72R, with the higher inter-layer separations reflecting the decreasing graphitic nature of the carbon support and the decreasing order of corrosion resistance. Another indication of the corrosion resistance of the carbon supports is provided by the BET surface area measured using nitrogen. Vulcan XC72R has a surface area of about 200 $m^2/g$. This contrasts with a surface area of about 80 $m^2/g$ for Vulcan (graphitized). The much lower surface area as a result of the graphitization process reflects a loss in the more corrodible microporosity in Vulcan XC72R. The microporosity is commonly defined as the surface area contained in the pores of a diameter less than 20 Å. Shawinigan has a surface area of about 80 $m^2/g$, and BET analysis indicates a low level of corrodible microporosity available in this support.

For samples C1–C5, a conventional nominal 1:1 atomic ratio Pt/Ru alloy was deposited onto the indicated carbon support first. This was accomplished by making a slurry of the carbon black in demineralized water. Sodium bicarbonate was then added and the slurry was boiled for thirty minutes. A mixed solution comprising $H_2PtCl_6$ and $RuCl_3$ in an appropriate ratio was added while still boiling. The slurry was then cooled, formaldehyde solution was added, and the slurry was boiled again. The slurry was then filtered and the filter cake was washed with demineralized water on the filter bed until the filtrate was free of soluble chloride ions (as detected by a standard silver nitrate test). The filter cake was then oven dried at 105° C. in air, providing nominally 20%/10% Pt/Ru alloy carbon supported samples.

For samples C3–C5, a $RuO_2$ catalyst composition was formed on a previously prepared carbon supported Pt/Ru catalyst composition. This was accomplished by making a slurry of the carbon supported Pt/Ru sample in boiling demineralized water. Potassium bicarbonate was added next and then $RuCl_3$ solution in an appropriate ratio while still boiling. The slurry was then cooled, filtered and filter cake washed with demineralized water as above until the filtrate was free of soluble chloride ions (as detected by a standard silver nitrate test). The filter cake was then oven dried at 105° C. in air until there was no further mass change. Finally, each sample was placed in a controlled atmosphere oven and heated for two hours at 350° C. under nitrogen.

Sample C6 was prepared in a like manner to C3–C5 except that the $RuO_2$ catalyst composition was deposited directly onto uncatalyzed Shawinigan acetylene black.

For sample C7, an $IrO_2$ catalyst composition was formed on a carbon support. This was accomplished by making a slurry of the carbon black in boiling demineralized water. Sodium bicarbonate was added next and then $IrCl_3$ solution in an appropriate ratio while still boiling. The slurry was then cooled, filtered and the filter cake washed with demineralized water as above until the filtrate was free of soluble chloride ions (as detected by a standard silver nitrate test). The filter cake was then oven dried at 105° C. in air until there was no further mass change. Finally, the sample was placed in a controlled atmosphere oven and heated for four hours at 350° C. under nitrogen.

For sample C8, a catalyst composition comprising a solid solution of $RuO_2/TiO_2$ was formed on a carbon support. This was accomplished by making a slurry of the carbon black in boiling demineralized water. Sodium bicarbonate was added next, followed by a mixed solution comprising $RuCl_3$ and $TiCl_3$ in an appropriate ratio while still boiling. The slurry was then cooled, filtered and the filter cake washed with demineralized water as above until the filtrate was free of soluble chloride ions (as detected by a standard silver nitrate test). The filter cake was then oven dried at 105° C. in air until there was no further mass change. Finally, the sample was placed in a controlled atmosphere oven and heated for two hours at 350° C. under nitrogen.

Samples C9 and C10 were prepared in a like manner to C8, except that the mixed solution added to the slurry contained the appropriate ratios of $RuCl_3$ and $TiCl_3$, and the dried filter cakes were placed in a controlled atmosphere oven and heated for four hours at 350° C. under nitrogen.

For sample C11, a catalyst composition comprising a solid solution of $RuO_2/IrO_2$ was formed on a carbon support. This was accomplished by making a slurry of the carbon black in boiling demineralized water. Sodium bicarbonate was added next, followed by a mixed solution comprising $RuCl_3$ and $IrCl_3$ in an appropriate ratio while still boiling. The slurry was then cooled, filtered and the filter cake washed with demineralized water as above until the filtrate was free of soluble chloride ions (as detected by a standard silver nitrate test). The filter cake was then oven dried at 105° C. in air until there was no further mass change. Finally, the sample was placed in a controlled atmosphere oven and heated for six hours at 350° C. under nitrogen.

For sample C12, a catalyst composition comprising a solid solution of $IrO_2/TiO_2$ was formed on a carbon support. This was accomplished by making a slurry of the carbon black in boiling demineralized water. Sodium bicarbonate was added next, followed by an $IrCl_3$ solution and then a TiCl₃ solution in an appropriate ratio while still boiling. The pH of the slurry was maintained between 7 and 8 by the addition of further sodium bicarbonate. The slurry was then cooled, filtered and the filter cake washed with demineralized water as above until the filtrate was free of soluble chloride ions (as detected by a standard silver nitrate test). The filter cake was then oven dried at 105° C. in air until there was no further mass change. Finally, the sample was placed in a controlled atmosphere oven and heated for six hours at 350° C. under nitrogen.

Sample C13 was prepared in a like manner to C6.

Sample C14 was prepared in a like manner to C6, except that the dried filter cake was placed in an oven and heated in air at 180° C. for two hours.

Figure 3A:
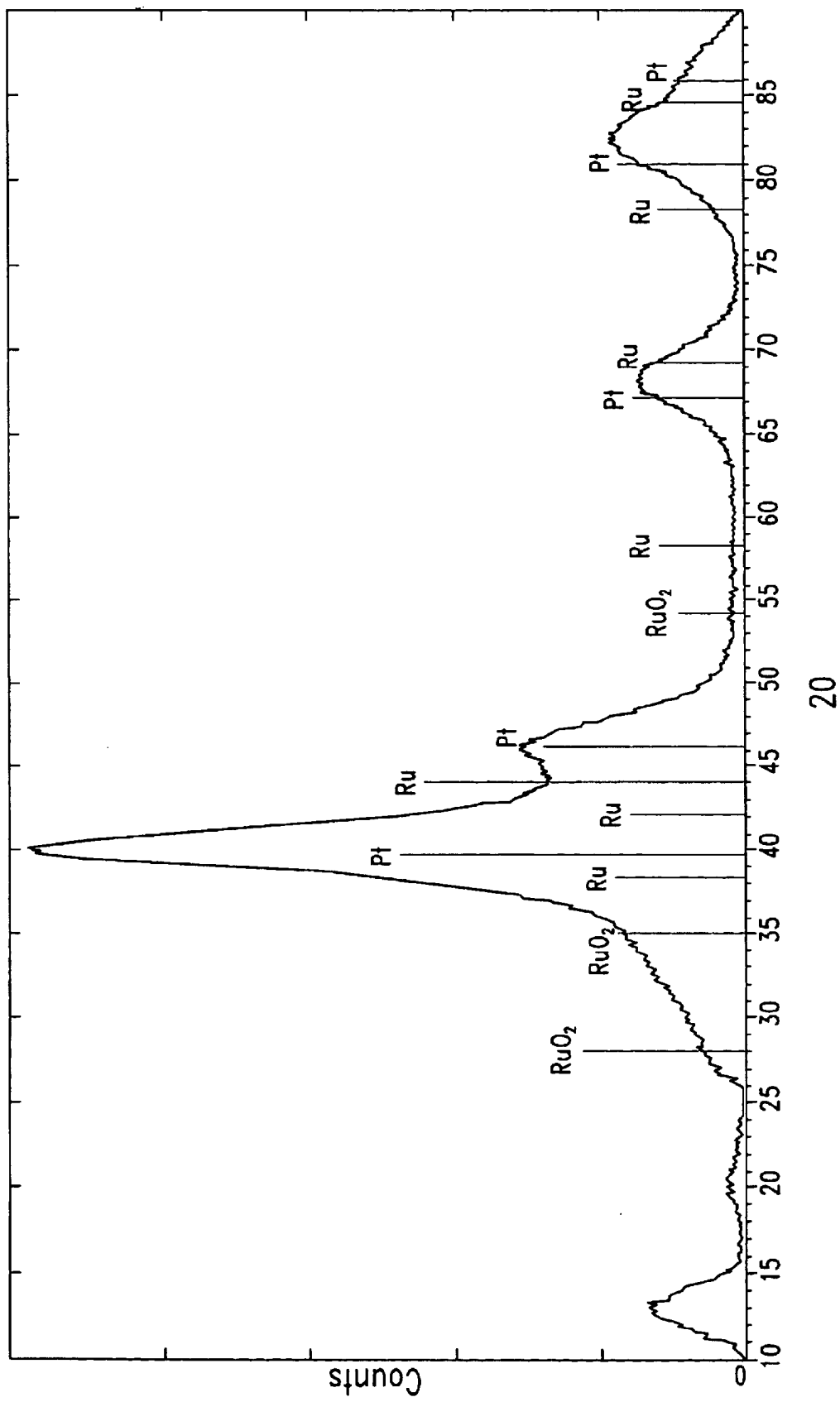
FIGS. 3A and 3B show the x-ray diffraction patterns of catalyst samples C1 and C3 in the Examples, respectively.

Sample C1 was assayed and was determined to contain 19.8% Pt and 9.6% Ru by weight. An x-ray diffraction pattern using Cu Kα radiation for this sample is shown in FIG. 3A. The pattern shows four major diffraction peaks for a single phase Pt crystalline material, with a cubic lattice structure, and the moderately graphitic carbon support (2θ= 26°) only. The face centered cubic lattice parameter for the Pt based peaks indicate some incorporation of Ru into the Pt cubic lattice. The analysis suggested that not all of the Ru was incorporated into the alloy and some unalloyed amorphous hydrous ruthenium oxide remained. Based on the analysis of the {111} and {220} reflections, the average crystallite size of the Pt based particles was determined to be 2.65 nm.

Sample C2 was assayed and was determined to contain 19.8% Pt and 9.3% Ru by weight. An x-ray diffraction pattern was recorded for this sample and showed that the only crystalline phase present was face centered cubic Pt (data not shown). A determination of the lattice parameter indicates some incorporation of Ru into the Pt lattice. The average crystallite size of the Pt was determined to be 1.9 nm.

Figure 3B:
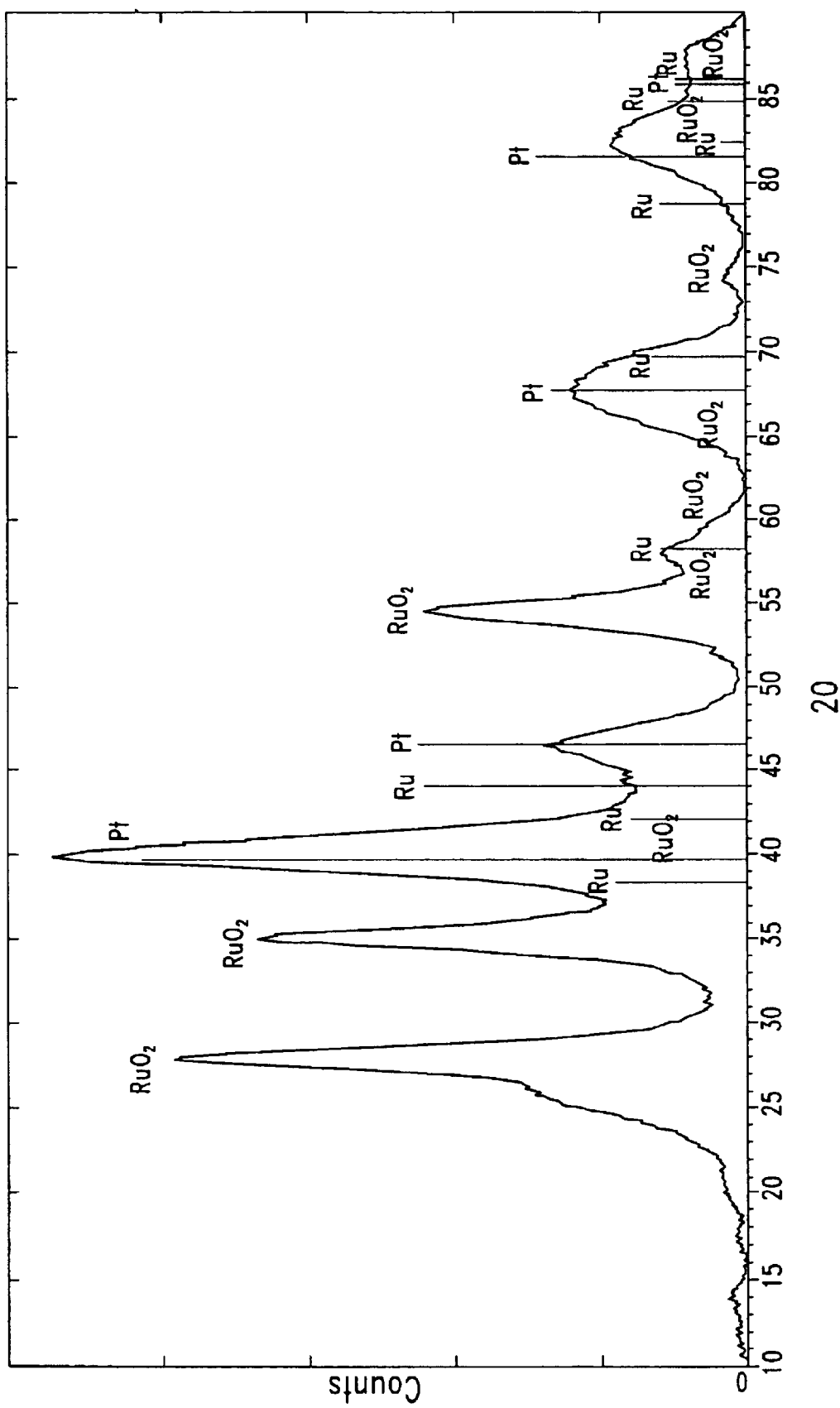

Sample C3 was also assayed and was determined to contain 14.7% Pt and 25.5% Ru by weight (nominally 15% Pt and 26% Ru, assuming that all the Ru from the first deposition step was present as metallic Ru alloyed with Pt and that all the Ru added in the second deposition step was present as $RuO_2$). An x-ray diffraction pattern for this sample is shown in FIG. 3B. The pattern shows peaks similar to those in FIG. 3A indicating that the Pt based phase remained substantially unchanged. Additionally now, peaks corresponding to a crystalline tetragonal $RuO_2$ (rutile) phase were observed (major peaks at 2θ angles of 28, 35, and 54°). The diffraction peak due to the graphitic nature of the carbon support remains as a shoulder peak at 26° on the edge of the major $RuO_2$ diffraction. The average crystallite size of the $RuO_2$ was determined to be 4.8 nm. No hexagonal metallic ruthenium phase or other additional phases were observed. Thus, sample C3 appears to contain two distinct crystalline catalyst phases.

Sample C4 was assayed and determined to contain 15.1% Pt and 25.0% Ru by weight. An x-ray diffraction pattern was recorded for this sample and showed the presence of both poorly crystalline face centered cubic Pt and tetragonal (rutile) $RuO_2$. The average crystallite size of $RuO_2$ was determined to be 3.7 nm.

Sample C5 was assayed and was determined to contain 12.1% Pt and 15.7% Ru by weight. An x-ray diffraction pattern was recorded for this sample and showed the presence of both poorly crystalline face centered cubic Pt and tetragonal (rutile) $RuO_2$. The average crystallite size of the $RuO_2$ could not be determined due to overlaps with cubic Pt peaks in the diffraction pattern.

Samples C6, C13 and C14 were assayed and were determined to contain 17.9%, 18.9%, and 19.0% Ru by weight, respectively. The samples were analyzed by x-ray diffraction, which showed the presence of crystalline tetragonal (rutile) $RuO_2$ in all three samples. The average crystallite size of the $RuO_2$ was determined to be 3.5, 2.2 and 13.0 nm for C6, C13 and C14, respectively. No hexagonal ruthenium metallic phase or additional crystalline phases were observed.

Samples C7 and C12 were assayed and were determined to contain 18.6% Ir, and 16.4% Ir and 0.5% Ti by weight, respectively. The samples were analyzed by x-ray diffraction, which showed a small amount of face centered cubic iridium metal, in the case of C12. No other crystalline phases were observed, indicating that the remainder of the Ir and Ti oxides were present as amorphous phases.

Samples C8, C9 and C10 were assayed and were determined to contain 15.8% Ru and 7.8% Ti, 17.6% Ru and 3.6% Ti, and 17.4% Ru and 1.0% Ti by weight, respectively. The samples were analyzed by x-ray diffraction, which showed the presence of poorly crystalline tetragonal phase in each case. For C8, a determination of the lattice parameter from the x-ray diffraction pattern showed it to be identical to $RuO_2$, indicating little if any incorporation of $TiO_2$ into the $RuO_2$ lattice. However, no indication of crystalline $TiO_2$ was found in the sample. For C9, a determination of the lattice parameter did indicate some incorporation of $TiO_2$ into the $RuO_2$ lattice. Again, no separate crystalline $TiO_2$ phase was observed. For C10, a determination of the lattice parameter showed it to be identical to $RuO_2$, although at this low proportion of $TiO_2$ it is unlikely that a shift in the lattice parameter caused by the presence of $TiO_2$ in the $RuO_2$ lattice could be observed.

Sample C11 was assayed and determined to contain 16.2% Ru and 3.2% Ir by weight. X-ray diffraction analysis indicated the sample contained a poorly crystalline tetragonal (rutile) phase. A determination of the lattice parameter showed it to be indistinguishable from that of $RuO_2$ and $IrO_2$. Given that the lattice parameters of $RuO_2$ and $IrO_2$ are very similar, it was not possible to conclude whether the Ru and Ir were present as a single phase, or two separate phases.

Ex-situ oxygen evolution performance of the preceding catalyst compositions was evaluated as indicated below.

Tests were performed on a glassy carbon rotating-disk electrode (RDE) with a rotation rate of 1000 rpm in 0.5 M $H_2SO_4$ at a temperature of 80° C. Test samples were prepared by suspending 0.020 g of the catalyst composition powder in 2 ml ethanoic acid. A micropipette was used to apply 2 μl of the suspension to the RDE and a heat gun was used to dry it. Then, 2 μl of a solution of dilute Nafion® (10 μg/L of solid Nafion®) was then applied on top and dried.

After the RDE was installed and rotated, the cyclic voltammogram was run in nitrogen for 40 cycles at 100 mV/s from 0.1 to 1.0 V, to clean the solution and the surface. Oxygen was then bubbled through the electrolyte for 15 minutes, at the end of which was run the oxygen evolution potentiodynamic sweep from 0.1 to 1.5 V at 5 mV/s. After cleaning the RDE surface, the catalyst solution and Nafion® solutions were then reapplied to the RDE and the process repeated.

Figure 4A:
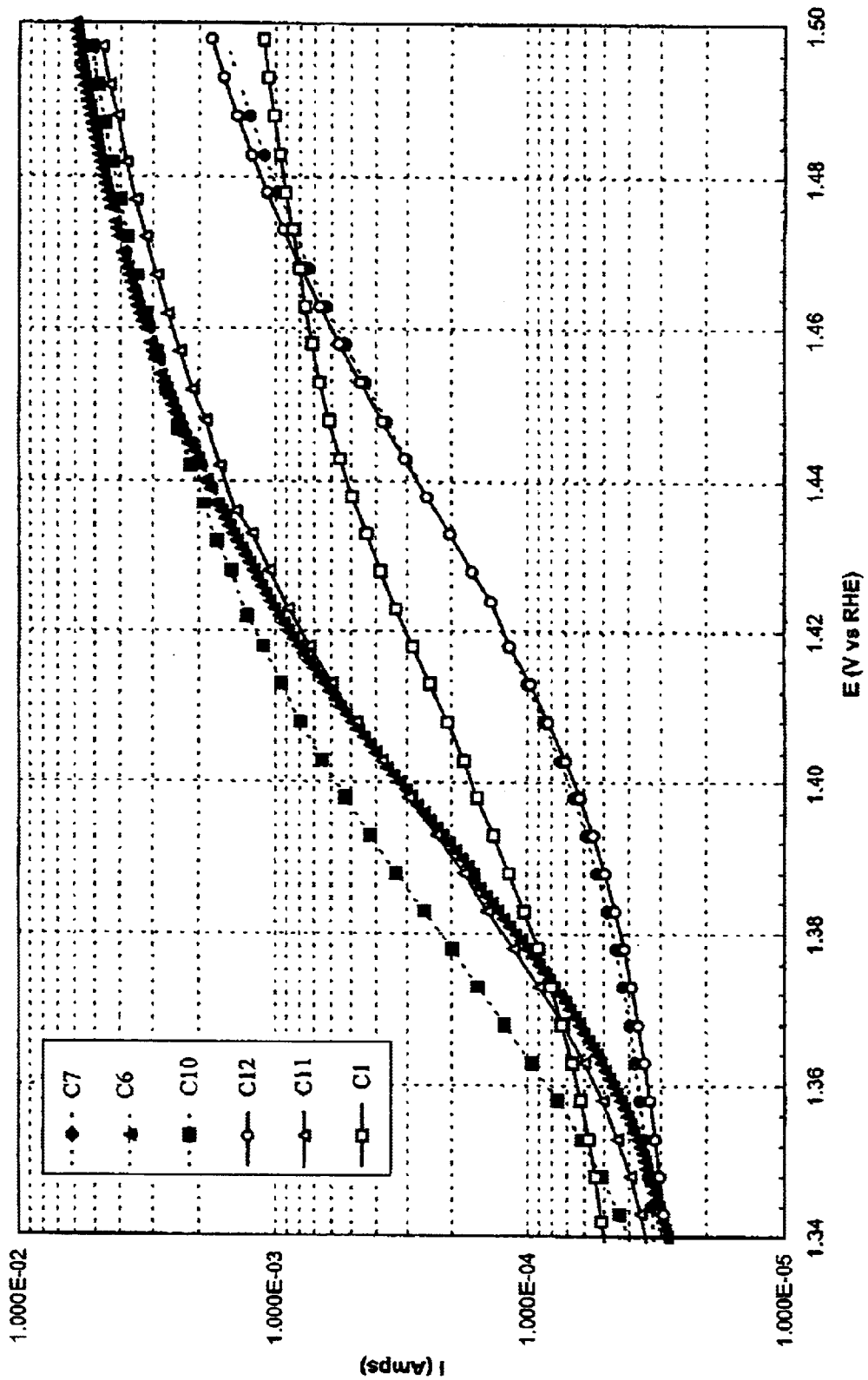
FIGS. 4A, 4B and 4C are Tafel plots of ex-situ oxygen evolution for catalyst compositions C1, C6–C10, and C12–C14 in the Examples.

FIG. 4A is a Tafel plot of the oxygen evolution of several of the prepared catalyst compositions. Overall, the $RuO_2$-containing samples C6, C10 and C11 performed better than sample C1 (conventional supported Pt/Ru catalyst composition), whereas samples C7 and C12 performed less well than sample C1. It is proposed that the poor performance of samples C7 and C12 may be due to the $IrO_2$ being in an amorphous phase (discussed further below).

Figure 4B:
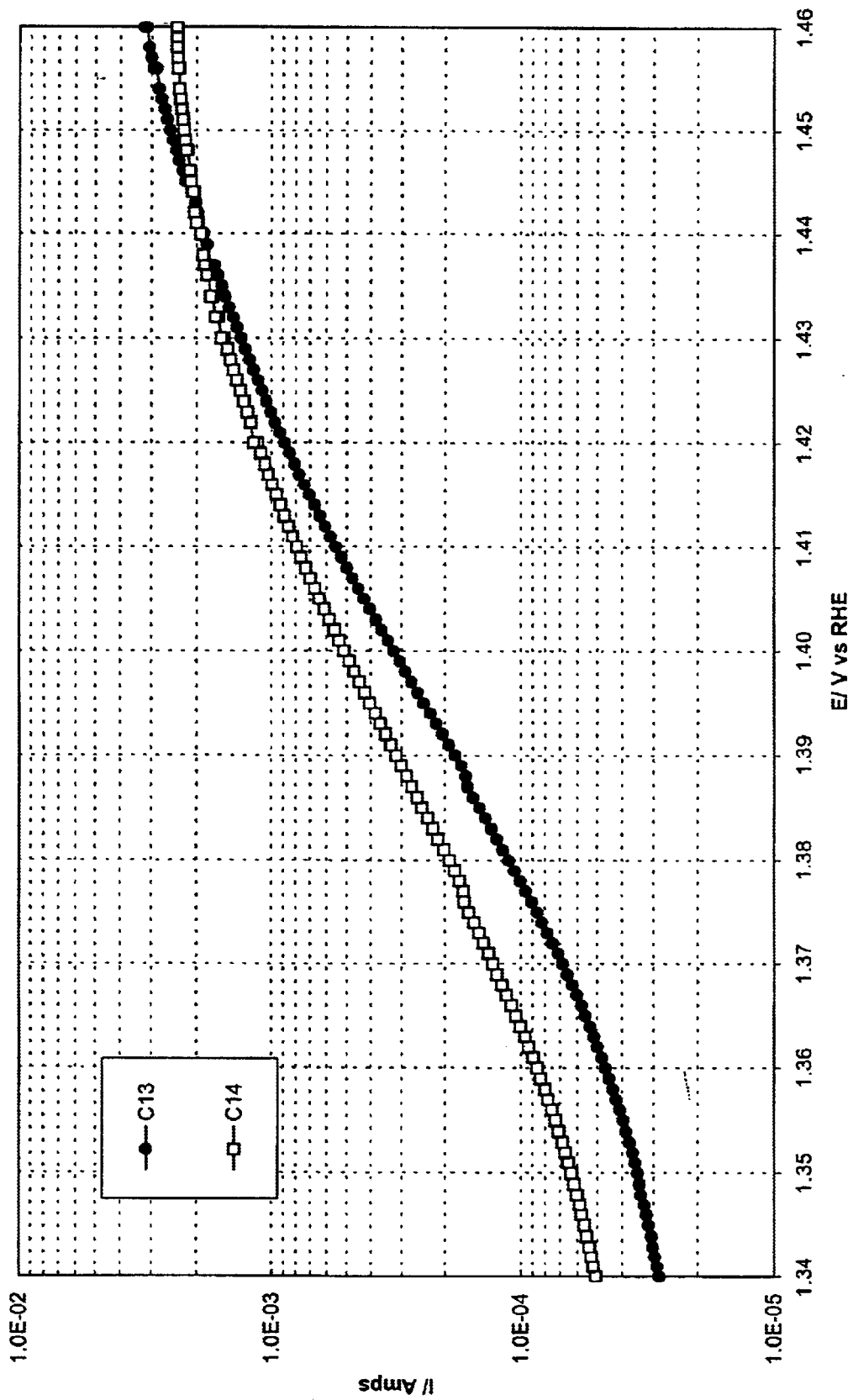

FIG. 4B is a Tafel plot of the oxygen evolution of samples C13 and C14. As shown in FIG. 4B, the performance of C14, particularly at lower currents, is significantly better than the performance of C13. The only significant difference between the samples is the larger crystal size of C14. It is thought that performance may be related to the crystal size of the sample. By analogy, it is assumed that the relatively poor performance of the $IrO_2$-containing samples is similarly due, at least in part, to the lack of discernable crystal structure.

Figure 4C:
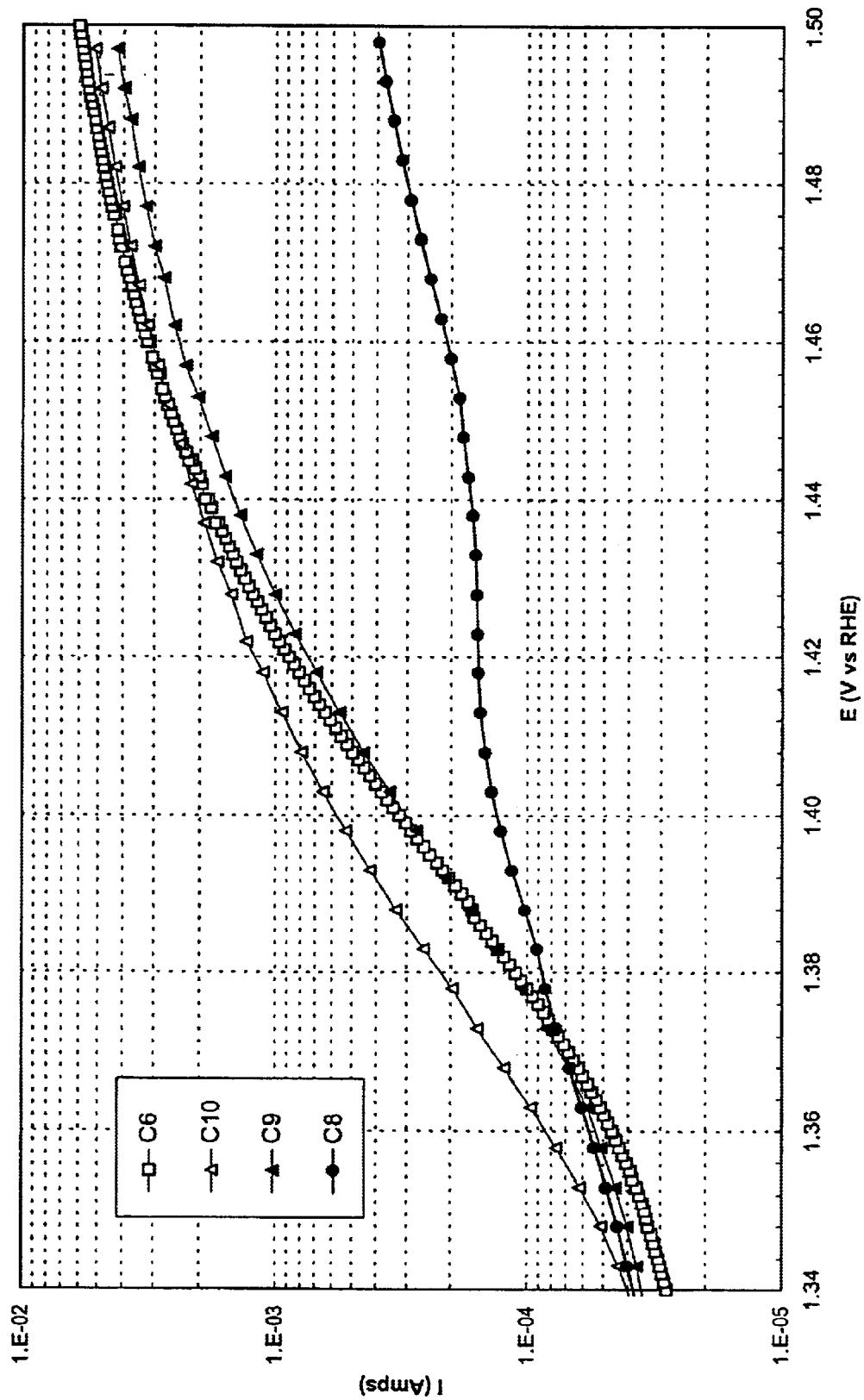

FIG. 4C is a Tafel plot of the oxygen evolution of samples C6 and C8–C10, and illustrates the effect of varying the amount of $TiO_2$ in solid solutions of $RuO_2/TiO_2$. As shown in FIG. 4B, sample C10 (90:10 Ru/Ti atomic ratio) exhibited superior performance to sample C6 ($RuO_2$ catalyst composition). Sample C9 (70:30 Ru/Ti atomic ratio) exhibited comparable performance to sample C6, whereas sample C7 (50:50 Ru/Ti atomic ratio) exhibited poorer performance in comparison. Thus, it seems that increasing the ratio of Ti in the $RuO_2/TiO_2$ solid solution beyond about 70:30 Ru/Ti results in loss of oxygen evolution performance, relative to the $RuO_2$ catalyst composition.

Tests more representative of cell reversal tolerance in fuel cell operation were then performed in an effort to correlate the ex-situ oxygen evolution performance results of the catalyst composition samples with voltage reversal tolerance in solid polymer electrolyte fuel cells.

A series of solid polymer fuel cells was constructed in order to determine how additional $RuO_2$ incorporated into the anode in various ways improved tolerance during voltage reversal. A set of anodes was then prepared using some of the preceding catalyst compositions in various combinations for evaluation in test fuel cells. In these anodes, the catalyst compositions were applied in one or more separate layers in the form of aqueous inks on porous carbon substrates using a screen printing method. The aqueous inks comprised catalyst, ion conducting ionomer, and a binder. The MEAs (membrane electrode assemblies) for these cells employed a conventional cathode having platinum black (that is, unsupported) catalyst applied to a porous carbon substrate, and a conventional perfluorinated solid polymer membrane. The catalyst loadings on the anodes were in the range of 0.2–0.3 mg $Pt/cm^2$.

The fuel cells prepared included:

| | |
|---|---|
| FC1: | anode has a single catalyst layer containing composition C1; |
| FC2: | anode has a single catalyst layer containing composition C2; |
| FC3: | anode has a single catalyst layer containing composition C3; |
| FC4: | anode has a single catalyst layer containing composition C4; |
| FC5: | anode has a single catalyst layer containing composition C5; |
| FC6: | anode has a single catalyst layer containing composition C6; |
| FC2/6: | anode has two layers of catalyst, a lower layer adjacent the substrate containing composition C2 and an upper layer containing composition C6. |
| FC6/2: | anode has two layers of catalyst, a lower layer adjacent the substrate containing composition C6 and an upper layer containing composition C2. |
| FC2 + 6: | anode has a single catalyst layer containing a mixture of compositions C2 and C6. |

Each cell was conditioned prior to voltage reversal testing by operating it normally at a current density of about 0.5 $A/cm^2$ and a temperature of approximately 75° C. Humidified hydrogen was used as fuel and humidified air as the oxidant, both at 200 kPa pressure. The stoichiometry of the reactants (that is, the ratio of reactant supplied to reactant consumed in the generation of electricity) was 1.5 and 2 for the hydrogen and oxygen-containing air reactants, respectively. The output cell voltage as a function of current density (polarization data) was then determined. After that, each cell was subjected to a voltage reversal test by flowing humidified nitrogen over the anode (instead of fuel) while forcing 10A current through the cell for 23 minutes using a constant current power supply connected across the fuel cell. (The period of 23 minutes was selected on the basis of results from cell FC2. This time period was significant enough to cause some damage to its conventional anode without causing the extensive damage associated with large increases in the anode potential.)

During the voltage reversal, the cell voltage versus time was recorded. The production of $CO_2$ and $O_2$ gases were also monitored by gas chromatography and the equivalent currents consumed to produce these gases were calculated in accordance with the preceding reactions for a fuel starvation condition. Polarization data for each cell was obtained after the reversals to determine the effect of a single reversal episode on cell performance.

Then, each cell was subjected to a second voltage reversal test at a 10 A current. This time, however, the reversal current was interrupted five times during the test period to observe the effect of repeated reversals on the cells. After 5 minutes of operation in reversal, the current was cycled on and off five times (20 seconds off and 10 seconds on) after which the current was left on until a total "on" time of 23 minutes had been reached. Following the second reversal test, polarization measurements of each cell were obtained.

Figure 5A:
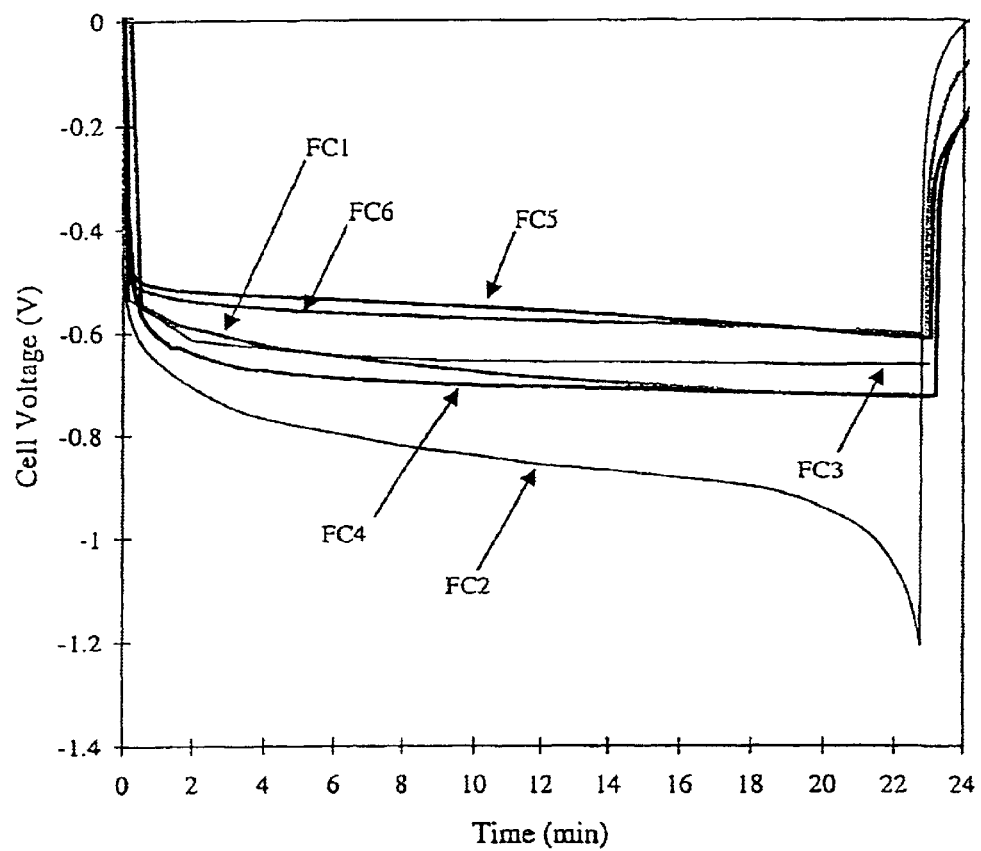
FIGS. 5A and 5B are composite plots of voltage as a function of time, as well as the currents consumed in the production of $CO_2$ as a function of time, respectively, for cells FC1–FC6 in the Examples during the first voltage reversal period.

FIG. 5A shows the voltage versus time plots for cells FC1–FC6 during the first voltage reversal period. Cell FC3 had a similar anode to cell FC1 except that cell FC3 additionally contained $RuO_2$. Cell FC3 operated at a slightly lower anode potential than cell FC1 during reversal (that is, at a less negative cell voltage). Cell FC4 had a similar anode to cell FC2 except that cell FC4 additionally contained $RuO_2$. Cell FC4 operated at a significantly lower anode potential than cell FC2 during reversal. Near the end of the reversal period, the anode potential in cell FC2 rose dramatically. Cell FC5 had a similar anode to cell FC4 except that the carbon support had been graphitized. Cell FC5 operated at a significantly lower anode potential than cell FC4 during reversal.

Figure 5B:
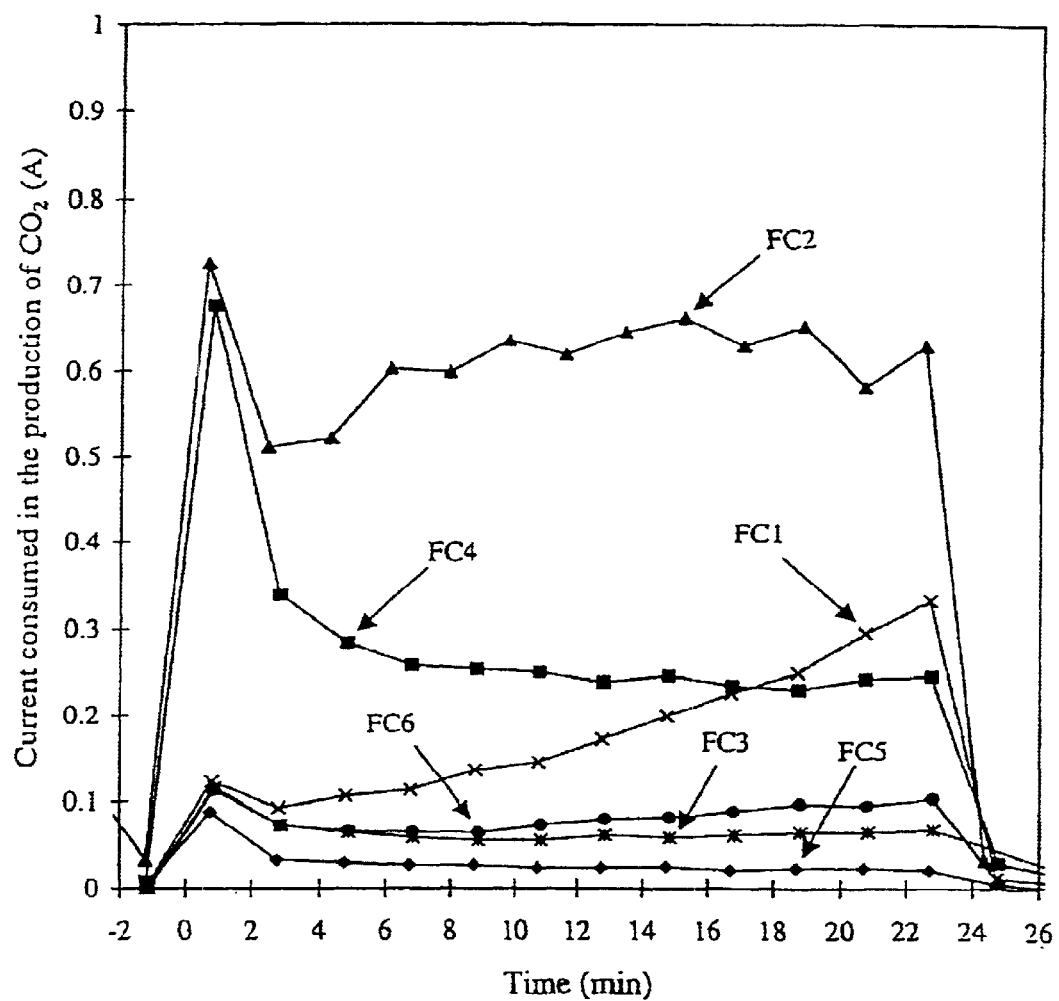

FIG. 5B shows the current consumed in the production of $CO_2$ versus time plots for cells FC1–FC6 during the first reversal period. Cell FC3 shows less $CO_2$ production over time than cell FC1. Also, cell FC4 shows less $CO_2$ production over time than cell FC2. Cell FC5 shows less $CO_2$ production over time than cell FC4. Cell FC6 containing only the electrolysis catalyst $RuO_2$ showed a $CO_2$ production level somewhat greater than cell FC3. (Note that substantially, the current forced through the cells during reversal testing could be accounted for by the sum of the equivalent currents associated with the generation of $CO_2$ and $O_2$. Thus, the reaction mechanisms above appear consistent with the test results.)

Figure 6A:
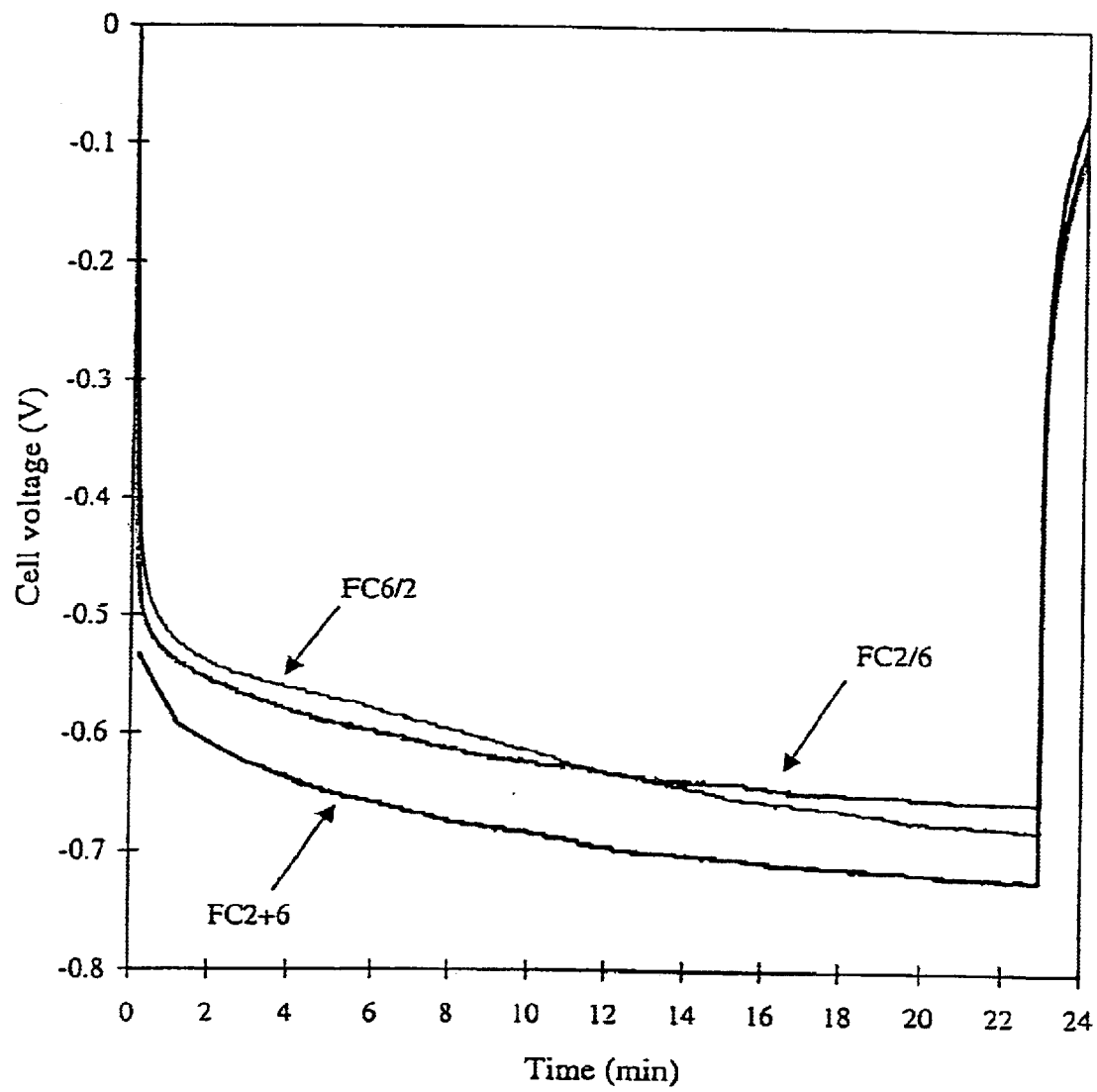
FIGS. 6A and 6B are composite plots of voltage as a function of time, as well as the currents consumed in the production of $CO_2$ as a function of time, respectively, for cells FC2/6, FC6/2, and FC2+6 in the Examples during the first voltage reversal period.
Figure 6B:
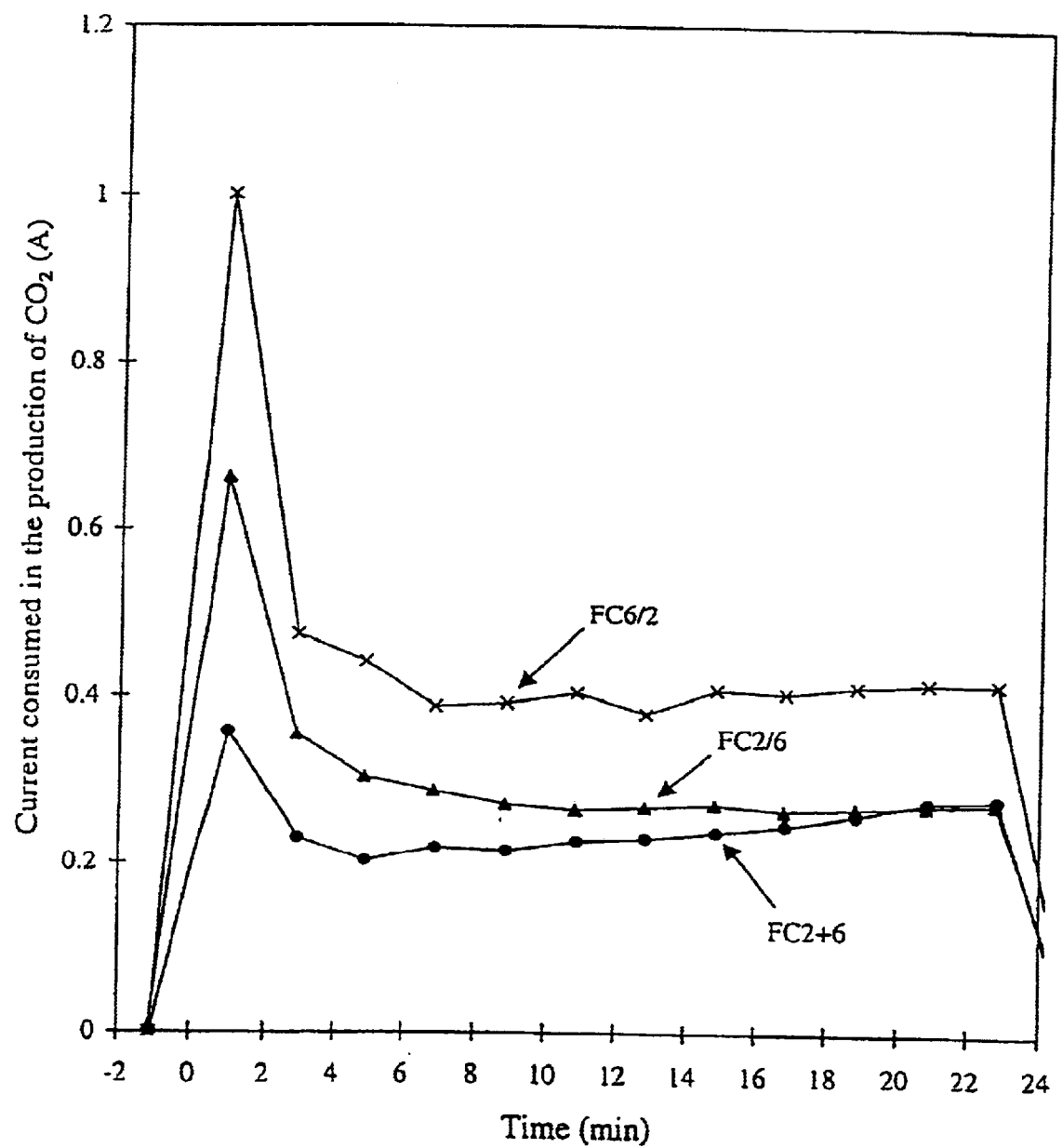

FIG. 6A shows the voltage versus time plots for cells FC2/6, FC6/2, and FC2+6 during the first voltage reversal period. These cells have a similar anode to cell FC2 except that they contained additional $RuO_2$ either in another layer or mixed in the same layer on a different carbon support. FIG. 6B shows the current consumed in the production of $CO_2$ versus time plots for these same cells. These cells operated at somewhat lower anode potentials than cell FC2 and showed somewhat less $CO_2$ production over time than cell FC2.

Figure 7:
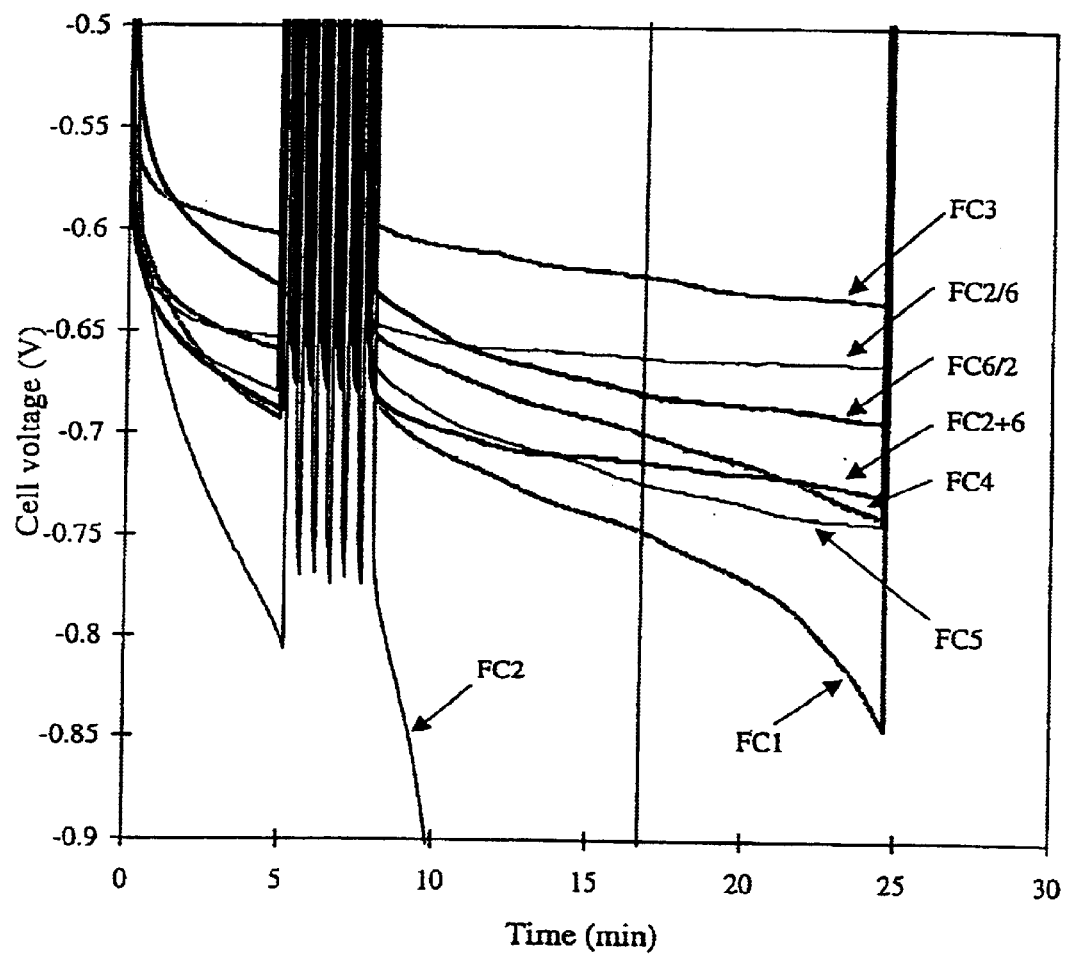
FIG. 7 is a plot of voltage as a function of time for selected cells in the Examples during the second voltage reversal test.

FIG. 7 shows the voltage versus time plots for the cells during the second voltage reversal test (except for cell FC6 that was not tested). This time, cell FC3 showed the lowest anode potential near the end of the reversal test.

The Table below summarizes the results of the polarization testing. In this Table, the voltages were determined at a current density of 800 amps/ft$^2$ (860 mA/cm$^2$).

| Fuel cell # | Voltage before reversal tests (mV) | ΔV (mV before tests - mV after 1st reversal test) | ΔV (mV before tests - mV after 2nd reversal test) |
|---|---|---|---|
| FC1 | 616 | 33 | 149 |
| FC2 | 594 | 120 | >394* |
| FC3 | 521 | 27 | 89 |
| FC4 | 438 | 23 | 64 |
| FC5 | 590 | 47 | 50 |
| FC2/6 | 272 | >72* | >72* |
| FC6/2 | 561 | 37 | 88 |
| FC2 + 6 | 516 | 30 | 87 |

*The programmable load was incapable of sustaining 800 amps/ft$^2$ (860 mA/cm$^2$) when the voltage across the fuel cell was less than 200 mV and thus the cell voltage was only known to be less than 200 mV at 800 amps/ft$^2$ (860 mA/cm$^2$).

The above examples show that, for a given carbon support, the addition of $RuO_2$ to the anode results in a reduction in the anode overpotential and in carbon corrosion during voltage reversal and also results in less subsequent performance degradation (comparing cells FC4 and FC5 to FC2, and cell FC3 to FC1). Further, such improvements may be obtained by adding the $RuO_2$ in a variety of ways. For instance, the $RuO_2$ may be deposited onto a conventional carbon supported catalyst used in the anode (for example, FC4) or deposited onto another carbon support and added to the anode in a separate catalyst layer (for example, FC6/2) or added to the anode in the same layer as the conventional catalyst (for example, FC2+6).

On the basis of the anode voltages and carbon corrosion observed during the first reversal tests alone, it would appear that graphitized Vulcan furnace black is the preferred choice for a reversal tolerant carbon support, followed by Shawinigan acetylene black, and then the untreated Vulcan furnace black. However, consideration should be given to additional factors in the selection of a preferred carbon support (for example, effects in multiple and/or other voltage reversal scenarios).

A second series of solid polymer fuel cells was constructed in order to evaluate how incorporating various of the prepared catalyst compositions into the anode improved tolerance during voltage reversal in cells operating on reformate (instead of on pure hydrogen fuel as in the preceding series).

A second set of anodes was thus prepared using various combinations of catalyst compositions for evaluation in test fuel cells. In these anodes, the catalyst compositions were applied by spraying an aqueous ink comprising catalyst, ion conducting ionomer, and a binder onto porous carbon substrates to a total Pt loading of about 0.1 mg/cm$^2$. The MEAs (membrane electrode assemblies) for these cells employed a conventional cathode having carbon-supported platinum catalyst applied to a porous carbon substrate (Pt supported on Vulcan XC72R; Pt loading≈0.7 mg/cm$^2$), and a conventional Nafion® perfluorinated solid polymer membrane.

The fuel cells prepared included:

| | |
|---|---|
| FCR1: | anode has a single catalyst layer containing composition C1; |
| FCR2: | anode has a single catalyst layer containing composition C2; |
| FCR3: | anode has a single catalyst layer containing composition C3; |
| FCR1 + 6: | anode has a single catalyst layer containing a mixture of compositions C1 and C6; |
| FCR1/6: | anode has two layers of catalyst, a lower layer adjacent the substrate containing composition C1 and an upper layer containing composition C6; |
| FCR6/1: | anode has two layers of catalyst, a lower layer adjacent the substrate containing composition C6 and an upper layer containing composition C1; |
| FCR2 + 6: | anode has a single catalyst layer containing a mixture of compositions C2 and C6; |
| FCR1 + 10: | anode has a single catalyst layer containing a mixture of compositions C1 and C10; |
| FCR1 + 11: | anode has a single catalyst layer containing a mixture of compositions C1 and C11; |
| FCR1 + 13: | anode has a single catalyst layer containing a mixture of compositions C1 and C13; |
| FCR1 + 14: | anode has a single catalyst layer containing a mixture of compositions C1 and C14. |

Each cell was conditioned prior to voltage reversal testing in a manner similar to that of the preceding series of cells. However, after conditioning all the subsequent testing on this second series was done with the fuel and air supplied at 160 kPa pressure and at stoichiometries of 1.2 and 1.5, respectively. Before subjecting the cells to voltage reversal testing, the output cell voltage as a function of current density (polarization data) was determined using reformate instead of humidified hydrogen. Here, the reformate comprises 65% hydrogen, 22% $CO_2$, 13% $N_2$, 40 parts per million (ppm) CO, saturated with water at 75° C., with an added 4% by volume air (the small amount of air being provided to counteract CO poisoning of the anode catalyst).

Each cell was then subjected to voltage reversal testing in three steps:

Step 1: 200 mA/cm$^2$ current was forced through each cell for 5 minutes while flowing humidified nitrogen (instead of fuel) over the anode. The cells were allowed to recover for 15 minutes at 1A/cm$^2$ while operating on hydrogen and air.

Step 2: The cells were subjected to 200 mA/cm$^2$ current pulses while operating on nitrogen and air. The pulse testing consisted of three sets of 30 pulses (10 seconds on/10 seconds off) with similar recovery periods (1 A/cm$^2$ while operating on hydrogen and air) for 15 minutes in between sets and overnight after the last set of pulses.

Step 3: 200 mA/cm$^2$ current was forced through the cells until −2V was reached. The polarization tests were then repeated on the cells using reformate fuel.

A first test was performed using cells FCR3, FCR1+6, FCR1/6, FCR6/1, FCR2+6, and FCR2, to evaluate the effect of incorporating $RuO_2$ into the anode improved voltage reversal tolerance. The Table below summarizes the results of the polarization testing before and after steps 2 and 3 in the voltage reversal testing. In this Table, the voltages were determined at a current density of 800 mA/cm$^2$.

| Fuel cell # | Voltage before reversal tests (mV) | ΔV (mV before tests - mV after Step 2) | ΔV (mV before tests - mV after Step 3) |
|---|---|---|---|
| FCR3 | 504 | 25 | >304* |
| FCR1 + 6 | 518 | −6 | 129 |
| FCR1/6 | 236 | −52 | >36* |
| FCR6/1 | 556 | 38 | 236 |
| FCR2 + 6 | 573 | 184** | ** |
| FCR2 | 544 | 237** | ** |

*The programmable load was incapable of sustaining 800 mA/cm$^2$ when the voltage across the fuel cell was less than 200 mV and thus the cell voltage was only known to be less than 200 mV at 800 mA/cm$^2$.
**These cells reached −2 V during the step 2 of voltage reversal testing at which point voltage reversal testing was halted and polarization data was obtained.

In cell FCR3, the $RuO_2$ was formed on the same carbon support as the conventional Pt/Ru catalyst, while in cell FCR1+6, $RuO_2$ and the conventional Pt/Ru catalysts were formed on separate batches of the same carbon support and the two catalysts were then mixed together. Both cells showed similar behavior before reversal testing began and also during the first two voltage reversal testing steps. However, while both cells operated about the same length of time during step 3 (to the −2V voltage cutoff), cell FCR3 degraded significantly more than cell FCR1+6.

Cells FCR1/6 and FCR6/1 had separate $RuO_2$ catalyst layers adjacent the membrane and adjacent the anode substrate respectively. Cell FCR1/6 showed poor polarization performance initially which improved slightly after step 2. However, cell FCR1/6 was characterized by an exceptionally long electrolysis plateau during step 3 and thus appeared very resistant to degradation during voltage reversal. Cell FCR6/1 on the other hand showed good polarization performance initially but degraded substantially after step 3.

As illustrated in the Table above, cells FCR2 (employing Vulcan based carbon supported Pt/Ru catalyst) and FCR2+6 (employing an admixture of Vulcan based carbon supported Pt/Ru catalyst and Shawinigan based carbon supported $RuO_2$ catalyst) showed good initial polarization performance. The catalyst admixture of cell FCR2+6 appeared to help reduce the degradation associated with voltage reversal testing. However, both cells degraded significantly during voltage reversal testing to the point where the −2V voltage cutoff was reached before step 3 could be started.

In this first test, the admixture FCR1+6 showed the best polarization results after the voltage reversal testing. All of the cells with added $RuO_2$ (FCR3, FCR1+6, FCR1/6, FCR6/1 and FCR2+6), however, show improved voltage reversal tolerance over cell FCR2.

A second test was performed using cells FCR1, FCR1+6, FCR1+10 and FCR1+11, to evaluate the effect on voltage reversal tolerance of other oxides as mixtures and/or solid solutions with $RuO_2$ in the present anode structures.

Figure 8:
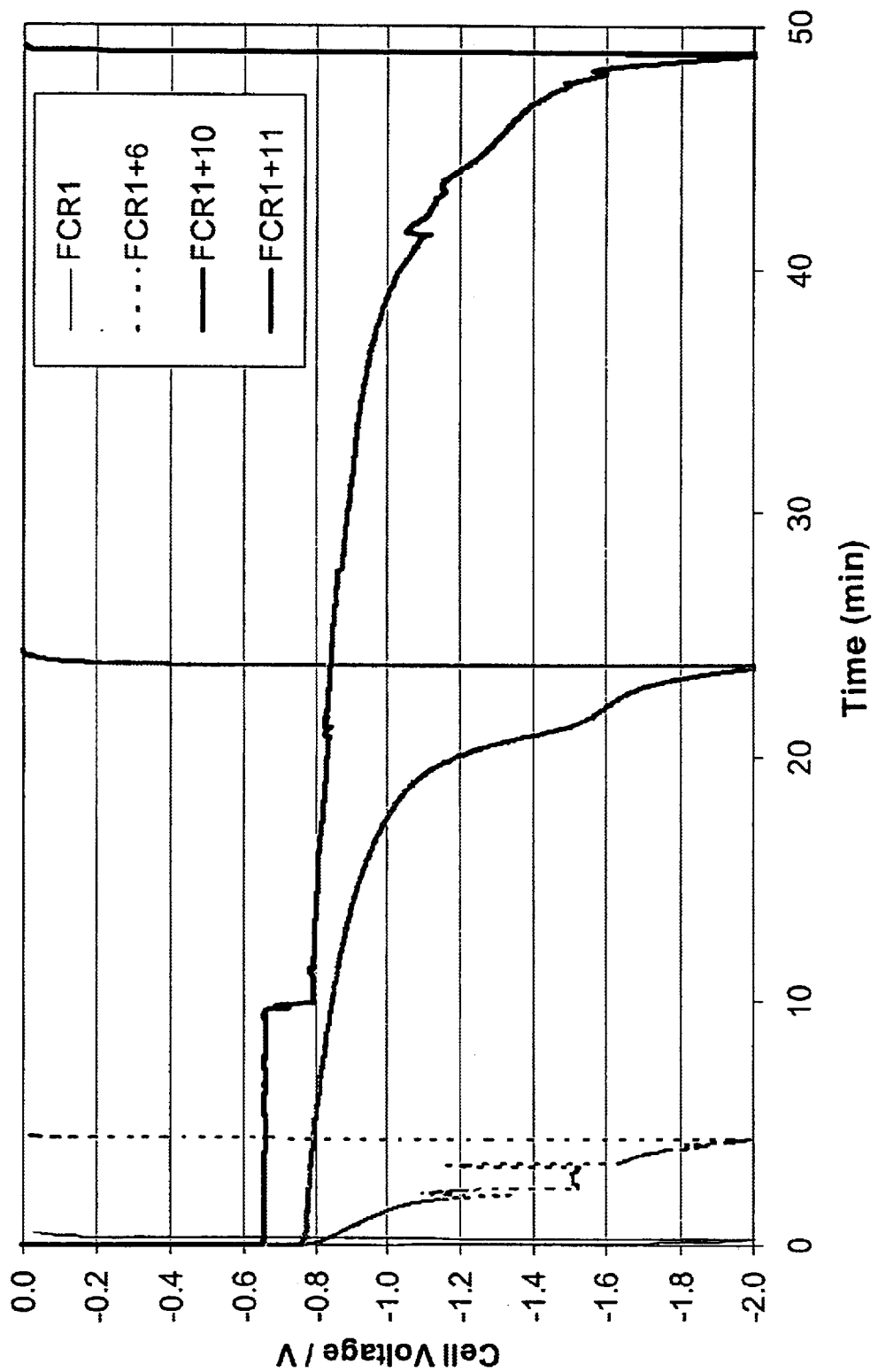
FIG. 8 is a plot of voltage as a function of time for cells FCR1, FCR1+6, FCR1+10, and FCR1+11 in the Examples during the step 3 of the voltage reversal test.

FIG. 8 shows the voltage versus time plots for cells FCR1, FCR1+6, FCR1+10, and FCR1+11 during step 3 of the voltage reversal testing. As shown in FIG. 8, cell FCR1 (incorporating conventional carbon supported Pt/Ru catalyst) degraded almost immediately (within about 15 seconds). FCR1+6 showed significant improvement over FCR1, but also degraded within 5 minutes. FCR1+10 (incorporating an admixture of carbon supported Pt/Ru catalyst and carbon supported $RuO_2/TiO_2$ catalyst) showed dramatic improvement over FCR1 and FCR1+6, and FCR1+11 (incorporating an admixture of carbon supported Pt/Ru catalyst and carbon supported $RuO_2/IrO_2$ catalyst) showed the best performance of the cells tested.

As illustrated in FIG. 8, catalyst compositions comprising $RuO_2$ showed marked increases in voltage reversal tolerance relative to the conventional Pt/Ru catalyst compositions. Further, catalyst compositions comprising mixtures and/or solid solutions of $RuO_2$ with $TiO_2$ or $IrO_2$ showed marked increases in voltage reversal tolerance relative to the $RuO_2$ catalyst compositions. The results suggest these mixtures/ solid solutions are better capable of withstanding deactivation and continue to demonstrate considerable rates of water electrolysis for much longer periods of time, and thus may be preferred if prolonged reversals are a concern.

A third test was performed using cells FCR1+6, FCR1+13 and FCR1+14, to evaluate the effect of crystal size in $RuO_2$ catalyst compositions on voltage reversal tolerance.

Figure 9:
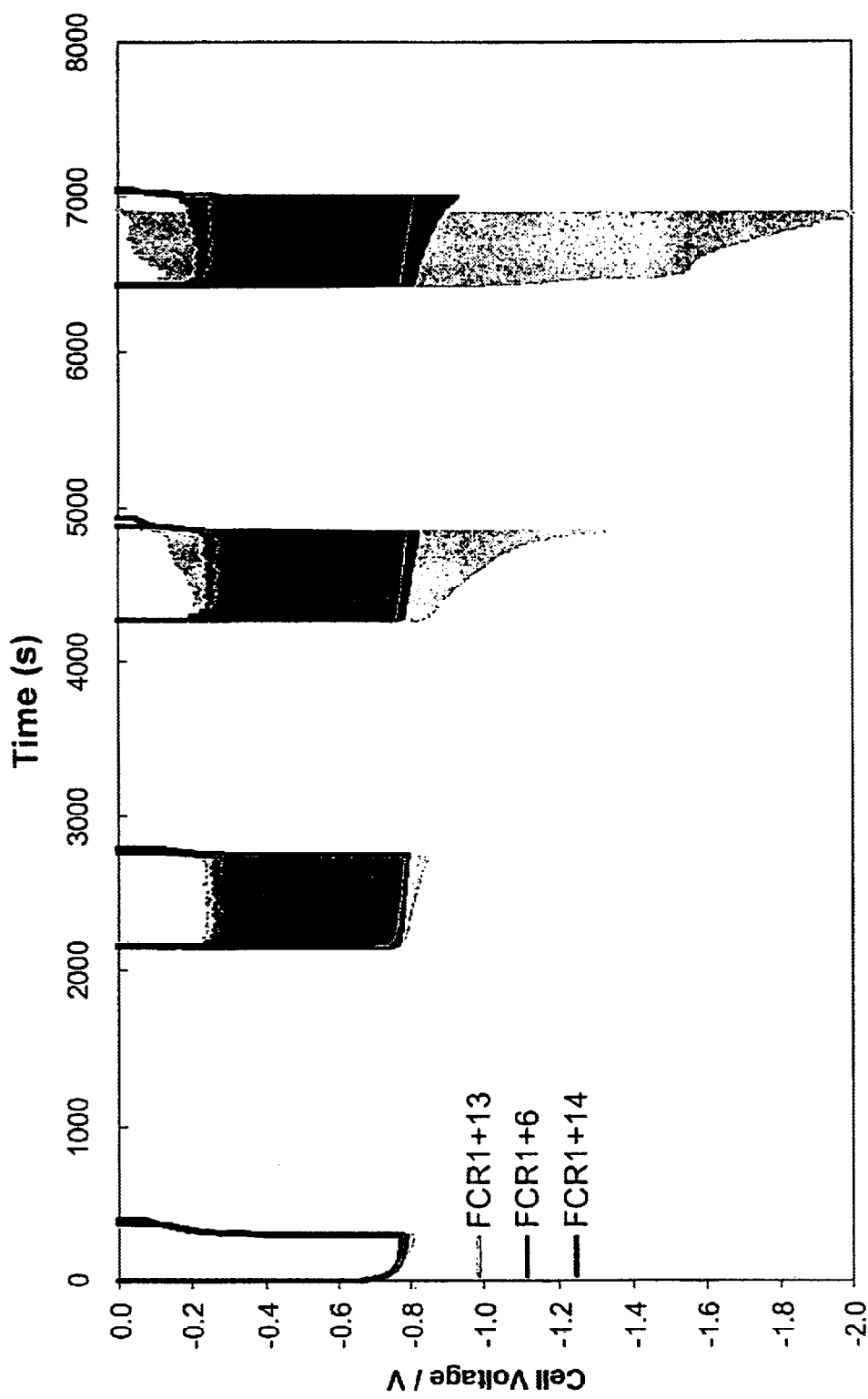
FIG. 9 is a plot of voltage as a function of time for cells FCR1+6, FCR1+13 and FCR1+14 in the Examples during steps 1 and 2 of the voltage reversal testing.

FIG. 9 shows the voltage versus time plots for cells FCR1+6, FCR1+13 and FCR1+14, during steps 1 and 2 of the voltage reversal testing. As illustrated in FIG. 9, all cells tested showed good initial polarization performance during step 1 (between 0 and 1000 seconds). FCR1+13 ($RuO_2$ crystal size, 2.2 nm) degraded significantly during voltage reversal testing to the point where the −2V voltage cutoff was reached before the third set of current pulses could be completed. FCR1+6 ($RuO_2$ crystal size, 6.5 nm) demonstrated a marked increase in voltage reversal tolerance compared to FCR1+13, although some degradation was observed, particularly during the third current pulse set. FCR1+14 (average $RuO_2$ crystal size, 13.0 nm), however, demonstrated the best voltage reversal tolerance, with no significant degradation during steps 2 and 3.

As illustrated in FIG. 9, it appears that there is a correlation between voltage reversal tolerance and $RuO_2$ crystal size in the $RuO_2$ catalyst compositions, with the larger crystals tested having the greatest voltage reversal tolerance. This data also correlates with the ex-situ oxygen evolution data.

While the present anodes have been described for use in solid polymer electrolyte fuel cells, it is anticipated that they would be useful in other fuel cells, as well. In this regard, "fuel cells" refers to any fuel cell having an operating temperature below about 250° C. The present anodes are preferred for acid electrolyte fuel cells, which are fuel cells comprising a liquid or solid acid electrolyte, such as phosphoric acid, solid polymer electrolyte, and direct methanol fuel cells, for example. The present anodes are particularly preferred for solid polymer electrolyte fuel cells.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. An anode for use in a fuel cell having improved tolerance to voltage reversal, said anode comprising a first catalyst composition for electrochemically oxidizing a fuel directed to said anode and a second catalyst composition capable of evolving oxygen from water, wherein said second catalyst composition comprises a metal oxide selected from the group consisting of precious metal oxides, mixtures of precious metal oxides, solid solutions of precious metal oxides, mixtures of precious metal oxides and valve metal oxides, and solid solutions of precious metal oxides and valve metal oxides, whereby voltage reversal tolerance is imparted to said fuel cell.

2. The anode of claim 1 wherein said fuel cell is an acid electrolyte fuel cell.

3. The anode of claim 1 wherein said fuel cell is a solid polymer electrolyte fuel cell.

4. The anode of claim 3 wherein said first catalyst composition is selected from the group consisting of precious metals, transition metals, oxides of precious metals and transition metals, alloys of precious metals and transition metals, and mixtures of precious metals and transition metals.

5. The anode of claim 3 wherein said first catalyst composition is selected from the group consisting of precious metals, alloys of precious metals, mixtures of precious metals, precious metals alloyed with transition metals, and mixtures of precious metals and transition metal oxides.

6. The anode of claim 3 wherein said first catalyst composition comprises a platinum-containing compound selected from the group consisting of platinum and an alloy of platinum and ruthenium.

7. The anode of claim 1 wherein said metal oxide comprises a precious metal oxide selected from the group consisting of $RuO_x$, $IrO_x$, and solid solutions of $RuO_x$ and $IrO_x$, wherein x is greater than 1.

8. The anode of claim 7 wherein x is about 2.

9. The anode of claim 1 wherein said metal oxide is selected from the group consisting of $RuO_2$ and solid solutions of $RuO_2$ and $IrO_2$.

10. The anode of claim 9 wherein said metal oxide comprises $RuO_2$.

11. An anode for use in a solid polymer electrolyte fuel cell having improved tolerance to voltage reversal, said anode comprising a first catalyst composition for electrochemically oxidizing a fuel directed to said anode and a second catalyst composition for evolving oxygen from water, said second catalyst composition comprising a metal oxide, wherein said metal oxide comprises a solid solution of $RuO_2$ and $IrO_2$ having iridium present in an atomic ratio of ruthenium to iridium of no greater than 90:10.

12. The anode of claim 1 wherein said metal oxide comprises a metal oxide selected from the group consisting of solid solutions of $RuO_x$ and a valve metal oxide, and solid solutions of $IrO_x$ and a valve metal oxide, wherein x is greater than 2.

13. The anode of claim 12 wherein said metal oxide comprises a solid solution of $RuO_2$ and a valve metal oxide.

14. An anode for use in a solid polymer electrolyte fuel cell having improved tolerance to voltage reversal, said anode comprising a first catalyst composition for electrochemically oxidizing a fuel directed to said anode and a second catalyst composition for evolving oxygen from water, said second catalyst composition comprising a metal oxide, and wherein said metal oxide comprises a solid solution of $RuO_2$ and $TiO_2$.

15. The anode of claim 14 wherein said metal oxide comprises a solid solution of $RuO_2$ and $TiO_2$ having titanium present in an atomic ratio of ruthenium to titanium of no greater than 50:50.

16. An anode for use in a solid polymer electrolyte fuel cell having improved tolerance to voltage reversal, said anode comprising a first catalyst composition for electrochemically oxidizing a fuel directed to said anode and a second catalyst composition for evolving oxygen from water, said second catalyst composition comprising a metal oxide, wherein said metal oxide comprises a solid solution of $RuO_2$ and a valve metal oxide, and wherein said solid solution has titanium present in an atomic ratio of ruthenium to titanium of no greater than 70:30.

17. The anode of claim 16 wherein said solid solution has titanium present in an atomic ratio of ruthenium to titanium of no greater than 90:10.

18. An anode for use in a solid polymer electrolyte fuel cell having improved tolerance to voltage reversal, said anode comprising a first catalyst composition for electrochemically oxidizing a fuel directed to said anode and a second catalyst composition for evolving oxygen from water, said second catalyst composition comprising a metal oxide, and wherein said metal oxide comprises a solid solution of $IrO_2$ and $TiO_2$ having titanium present in an atomic ratio of iridium to titanium of no greater than 90:10.

19. The anode of claim 1 wherein said first catalyst composition comprises a platinum-containing compound selected from the group consisting of platinum and an alloy of platinum and ruthenium.

20. The anode of claim 16 wherein said first catalyst composition is supported on a first carbon support.

21. The anode of claim 12 wherein said first catalyst composition comprises a platinum-containing compound selected from the group consisting of platinum and an alloy of platinum and ruthenium.

22. The anode of claim 14 wherein said first catalyst composition comprises a platinum-containing compound selected from the group consisting of platinum and an alloy of platinum and ruthenium.

23. The anode of claim 3 wherein said first catalyst composition is supported on a first electrically conductive particulate support.

24. The anode of claim 23 wherein said first catalyst composition is supported on a first carbon support.

25. The anode of claim 3 wherein said second catalyst composition is supported on a second electrically conductive particulate support.

26. The anode of claim 25 wherein said second catalyst composition is supported on a second carbon support.

27. The anode of claim 3 wherein said first and second catalyst compositions are supported on the same electrically conductive carbon particulate support.

28. The anode of claim 25 wherein said second catalyst composition is supported on a valve metal oxide support.

29. The anode of claim 1, said second catalyst composition comprising a metal oxide, and wherein said second catalyst composition is supported on a titanium oxide.

30. The anode of claim 3 wherein said first and second catalyst compositions are incorporated in a common layer in said anode.

31. The anode of claim 3 wherein said first and second catalyst compositions are incorporated in different layers in said anode.

32. The anode of claim 3 wherein said fuel stream comprises gaseous hydrogen.

33. A method of making a solid polymer electrolyte fuel cell tolerant to voltage reversal, said fuel cell comprising an anode, a cathode, and a solid polymer electrolyte, said anode comprising a first catalyst composition for electrochemically oxidizing a fuel directed to said anode, said method comprising incorporating a second catalyst composition in said anode capable of evolving oxygen from water, wherein said second catalyst composition comprises a metal oxide selected from the group consisting of precious metal oxides, mixtures of precious metal oxides, solid solutions of precious metal oxides, mixtures of precious metal oxides and valve metal oxides, and solid solutions of precious metal oxides and valve metal oxides, whereby voltage reversal tolerance is imparted to said fuel cell.

34. The method of claim 33 wherein said second catalyst composition is deposited on an electrically conductive particulate support.

35. The method of claim 34 wherein said second catalyst composition is deposited on a carbon support.

36. The method of claim 35 wherein said first catalyst composition and said second catalyst composition are deposited on said carbon support.

37. The method of claim 33 wherein said anode comprises a substrate and the method comprises mixing said first and second catalyst compositions and applying the mixture to said substrate in a common layer.

38. The method of claim 33 wherein said anode comprises a substrate and the method comprises applying said first and second catalyst compositions to said substrate in two separate discrete layers, thereby forming a bilayer anode.

39. A solid polymer electrolyte fuel cell having improved tolerance to voltage reversal prepared by the method of claim 33.

40. A membrane electrode assembly comprising the anode of any one of claims 1–31.

41. A fuel cell comprising the anode of any one of claims 1–31.

* * * * *

UNITED STATES PATENT AND TRADEMARK OFFICE
CERTIFICATE OF CORRECTION

| | |
|---|---|
| PATENT NO. | : 6,936,370 B1 |
| APPLICATION NO. | : 09/643550 |
| DATED | : August 30, 2005 |
| INVENTOR(S) | : Shanna D. Knights et al. |

It is certified that error appears in the above-identified patent and that said Letters Patent is hereby corrected as shown below:

<u>Title Page,</u>
Inventors item (75) "Jared" should read as --Jarad--.
Inventors item (75) "Reading" should read as --Berkshire--.
Title page, References Cited item (56) "6,171,721 B1 * 1/2001" should read as --6,171,721 B1 * 1/2002--.

Signed and Sealed this

Fourteenth Day of November, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,936,370 B1 | Page 1 of 1 |
| APPLICATION NO. | : 09/643550 | |
| DATED | : August 30, 2005 | |
| INVENTOR(S) | : Shanna D. Knights et al. | |

It is certified that error appears in the above-identified patent and that said Letters Patent is hereby corrected as shown below:

This certificate supersedes Certificate of Correction issued November 14, 2006, should be vacated since the Certificate of Correction granted for this patent number issued in error.

Signed and Sealed this

Twentieth Day of February, 2007

JON W. DUDAS
*Director of the United States Patent and Trademark Office*